United States Patent [19]
Bhattacharyya et al.

[11] Patent Number: 5,653,774
[45] Date of Patent: Aug. 5, 1997

[54] METHOD FOR PREPARING SYNTHESIS GAS USING NICKEL CATALYSTS

[75] Inventors: Alakananda Bhattacharyya, Wheaton; Wen-Dong Chang; Mark S. Kleefisch, both of Naperville; Carl A. Udovich, Joliet, all of Ill.

[73] Assignee: Amoco Corporation, Chicago, Ill.

[21] Appl. No.: 445,785

[22] Filed: May 22, 1995

Related U.S. Application Data

[62] Division of Ser. No. 353,052, Dec. 9, 1994, which is a division of Ser. No. 110,104, Aug. 20, 1993, Pat. No. 5,399,537, which is a continuation-in-part of Ser. No. 993,419, Dec. 21, 1992, abandoned.

[51] Int. Cl.$^6$ .................... C01B 3/32; B01J 21/16; B01J 29/04
[52] U.S. Cl. .................... 48/198.7; 48/212; 48/214 A; 48/215; 423/594; 423/651; 502/80; 502/84; 502/85
[58] Field of Search .................... 48/198.7, 212, 48/214 A, 215; 262/373; 423/651, 593, 594, 654; 502/80, 84, 85, 328, 335, 337

[56] References Cited

U.S. PATENT DOCUMENTS

| | | | |
|---|---|---|---|
| 2,482,866 | 9/1949 | Phinney | 48/198.7 |
| 2,655,442 | 10/1953 | Mayland | 48/198.7 |
| 3,340,012 | 9/1967 | Moehl | 48/198.7 |
| 3,342,751 | 9/1967 | Hayes | 48/198.7 |
| 3,368,982 | 2/1968 | Milbourne et al. | 48/198.7 |
| 3,417,029 | 12/1968 | McMahon | 48/214 A |
| 3,436,358 | 4/1969 | Thygesen | 48/212 |
| 3,515,527 | 6/1970 | Cockerham et al. | 48/214 A |
| 3,737,291 | 6/1973 | Lhomore et al. | 252/373 |
| 3,791,993 | 2/1974 | Rostrup-Nielsen | 423/654 |
| 3,865,753 | 2/1975 | Broecker et al. | 252/373 |
| 4,774,212 | 9/1988 | Drezdon | 502/84 |
| 4,877,550 | 10/1989 | Goetsch et al. | 252/373 |
| 4,923,837 | 5/1990 | Fukuhara et al. | 502/84 |
| 5,075,089 | 12/1991 | Misra et al. | 423/331 |
| 5,246,899 | 9/1993 | Bhattacharyya | 502/84 |
| 5,338,488 | 8/1994 | Choudhary et al. | 252/373 |
| 5,368,835 | 11/1994 | Choudhary et al. | 423/651 |
| 5,395,406 | 3/1995 | Clavenna et al. | 502/328 |

FOREIGN PATENT DOCUMENTS

| | | | |
|---|---|---|---|
| 2085314 | 4/1982 | United Kingdom | 252/373 |
| WO9211199 | 7/1992 | WIPO | 252/373 |

Primary Examiner—Christopher Kim
Attorney, Agent, or Firm—Thomas E. Nemo; Thomas A. Yassen; Robert E. Sloat

[57] ABSTRACT

A method and nickel-containing catalyst are disclosed for preparing synthesis gas by the reforming of a hydrocarbyl compound using an oxygen-containing compound.

20 Claims, 3 Drawing Sheets

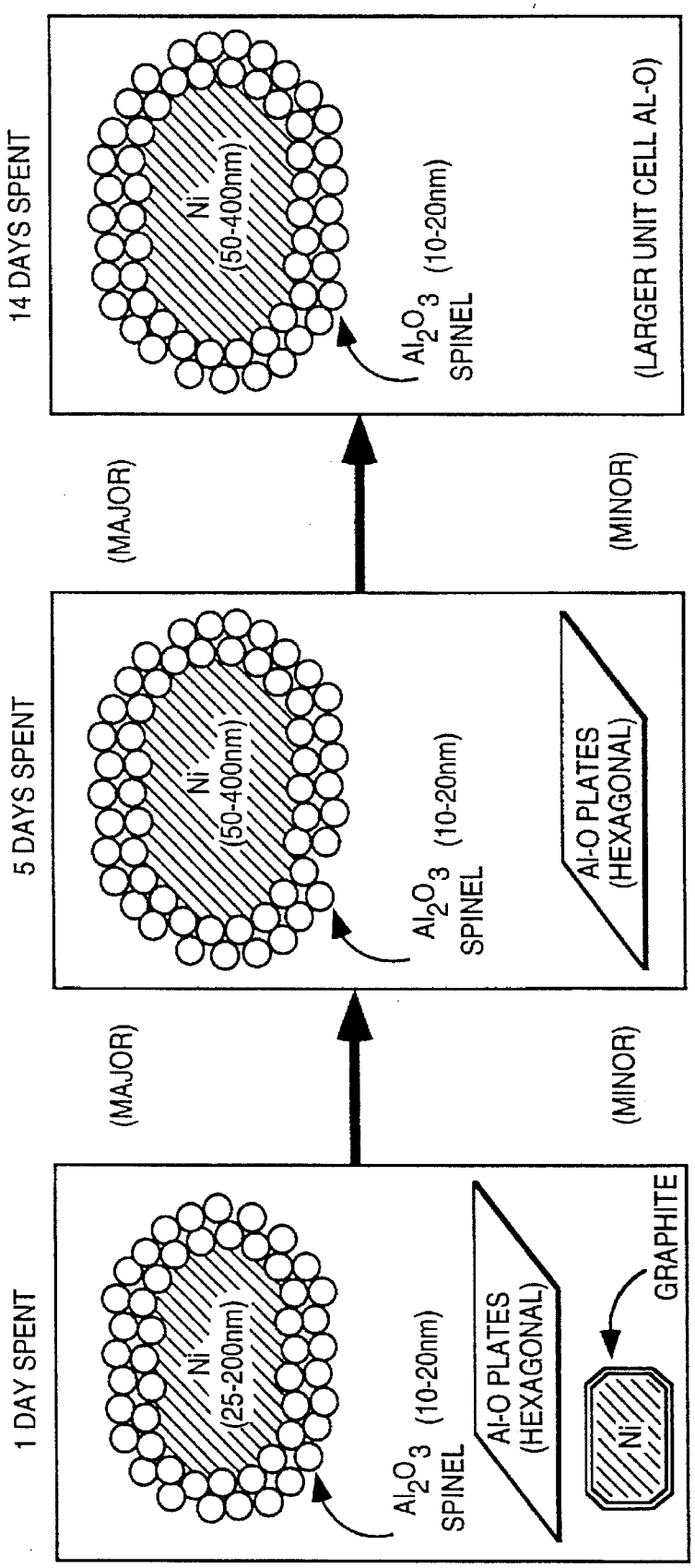

METHOD FOR PREPARING SYNTHESIS GAS USING NICKEL CATALYSTS

This is a divisional of application Ser. No. 08/353,052, filed Dec. 9, 1994, which is a divisional of 08/110,104 filed Aug. 20, 1993, U.S. Pat. No. 5,399,537, which, in turn, is a continuation-in-part of 07/993,419 filed Dec. 21, 1992 now abandoned.

FIELD OF THE INVENTION

This invention relates to a method for preparing synthesis gas by reacting a hydrocarbyl feed material with a source of oxygen at an elevated temperature. More particularly, this invention relates to the preparation of synthesis gas using new nickel-containing catalytic materials that are unusually resistant to deactivation. Additionally, this invention relates to new nickel-containing catalyst precursor and catalyst compositions that are useful for the production of synthesis gas and which catalysts are resistant to coke formation when used to catalyze the reaction of a hydrocarbyl compound with an oxygen-containing gas at elevated temperatures to form synthesis gas.

BACKGROUND OF THE INVENTION

Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons.

Perhaps the most common commercial source of synthesis gas is the steam reforming of coal or a hydrocarbon, particularly natural gas. In the steam reforming process, a mixture of water and the hydrocarbon are contacted at a high temperature, for example, in the range of about 850° to about 900° C., and typically in the presence of a catalyst, to form a mixture of hydrogen and carbon monoxide. Using methane as the hydrocarbon, the theoretical stoichiometry for the steam reforming reaction is as follows:

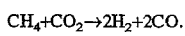

In prior steam reforming processes, because of the large amount of steam typically necessary to reduce coke formation, the ratio of $H_2$ to CO produced is typically greater than 3:1 and can be 5:1.

The steam reforming reaction is a highly endothermic reaction, and, as discussed above, it produces a relatively high molar ratio of hydrogen to carbon monoxide when conventional processes are used. In some processes using synthesis gas, the excess hydrogen is not necessary and must be separated from the CO. For example, the manufacture of methanol or acetic acid from synthesis gas requires less than a 3:1 molar ratio of hydrogen to carbon monoxide.

There are other methods for preparing synthesis gas that are more attractive than the steam reforming reaction. Synthesis gas produced by the partial oxidation of methane, for example, is an exothermic reaction and produces synthesis gas having a lower ratio of hydrogen to carbon monoxide, according to the following equation:

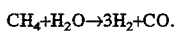

Synthesis gas can also be produced by the reaction of a hydrocarbyl compound such as methane with carbon dioxide. This reaction proceeds according to the following equation:

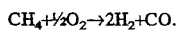

This reaction, like the steam reforming reaction, is endothermic; however, it produces a low ratio of hydrogen to carbon monoxide (1:1) and is very useful where there is an abundant supply of carbon dioxide, for example, at a refinery or near naturally-occurring $CO_2$ reserves. Additionally, the reforming reaction using carbon dioxide can also be used in conjunction with the steam reforming reaction to adjust the ratio of hydrogen to carbon monoxide.

In all of the hereinabove described processes for preparing synthesis gas, it is advantageous to conduct the reaction of the hydrocarbyl compound with the source of oxygen in the presence of a catalyst. For example, catalysts for the steam reforming of methane and other hydrocarbons are commonly based on nickel as the active catalyst component. Vernon et al. in Catalysis Letters, Vol. 6, pages 181–186, 1990, discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. While Vernon et al. discloses that nickel on alumina catalysts are effective for the conversion of methane to synthesis gas using molecular oxygen, we have determined that such a catalyst, as well as commercial nickel-containing steam reforming and steam cracking catalysts, form coke and deactivate relatively rapidly. While the other catalysts described in Vernon et al., such as ruthenium on alumina, can be used to reform a hydrocarbyl compound such as methane in the presence of molecular oxygen, such transition metals are expensive and the transition metal catalyst based on ruthenium we evaluated exhibited lower conversion and lower selectivity to synthesis gas compared to the catalysts of this invention. Ashcroft et al. in Nature, Volume 352, page 225, 1991, describes the reforming of methane with carbon dioxide to form synthesis gas using catalysts such as palladium, ruthenium and iridium on alumina, as well as nickel on alumina.

U.S. Pat. No. 3,791,993 to Rostrup-Nielsen discloses the preparation of catalysts containing nickel for reforming gaseous or vaporizable liquid hydrocarbons using steam, carbon oxide, oxygen and/or air. The catalysts disclosed therein are prepared by coprecipitating a nickel salt, a magnesium salt and an aluminate to form a sludge, washing the sludge until it is substantially free of sodium and potassium, drying, and then dehydrating at 300°–750° C. The ultimate catalyst is formed after a calcination step at 850°–1100° C. The examples in the 3,791,993 U.S. Patent show that compositions having a 1:1:2 or a 2:7:1 mole ratio of nickel, magnesium and aluminum, respectively, are suitable for converting naphtha to hydrogen-rich gaseous products using steam reforming.

In view of the great commercial interest in preparing synthesis gas by reforming readily available hydrocarbon feedstocks such as natural gas, and because of the benefits of conducting these reforming reactions in the presence of a catalyst that remains active for an extended period of use, there is a continuing need for new, less expensive, durable, coke resistant, more active and selective catalysts for the production of synthesis gas. The present invention provides such catalysts as well as a method for preparing synthesis gas using such catalysts.

The catalysts useful in the process of this invention can be prepared from a nickel-containing catalyst precursor compound having a structure that is referred to as "hydrotalcite-like." Hydrotalcite-like compounds are anionic clays, both natural and synthetic, that have a layered or sheet-like structure. For example, hydrotalcite, a naturally occurring mineral, has the chemical composition $[Mg_6Al_2(OH)_{16}]CO_3 \cdot 4H_2O$, and is composed of molecular "sheets", each sheet comprising a mixture of magnesium and aluminum hydroxides. The sheets are separated by carbonate ions which balance the net positive charge of the sheets. In these "sheets," the magnesium and aluminum ions are 6-fold coordinate in hydroxide, and the resulting octahedra share edges to form infinite sheets. Water molecules, like the carbonate ions, are randomly located in the space between these sheets. Although pure hydrotalcite contains only magnesium and aluminum cations, a variety of naturally occurring, as well as synthetic hydrotalcite-like compositions are known. A general formula for these hydrotalcite-like compounds is:

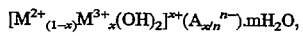

wherein x generally is a number between 0.1 and 0.50, $M^{2+}$ is a 2+ metal ion, for example, $Mg^{2+}$ and $M^{3+}$ is a 3+ metal ion, for example, $Al^{3+}$. The anion, $A^{n-}$, can be one of a number of anions such as carbonate. Hydrotalcite-like compounds containing borate as the anion have been disclosed by Bhattacharyya et al., in Inorganic Chemistry, Volume 31, page 3869, 1992. Drezdzon, in Inorganic Chemistry, Volume 27, page 4628, 1988, discloses the synthesis of isopolymetalate-pillared hydrotalcites.

As described above, hydrotalcite-like compounds share the "sheet-like" structural characteristics, which is conveniently identified using x-ray powder diffraction (XRD) analyses. Hydrotalcite-like materials typically have a d(001) value of at least about 7.8Å. Based on the size of the anion used, the hydrotalcite-like molecules can have d(001) values up to 15Å. The d(001) value is indicative of the inter layer spacing present in the hydrotalcite-like materials.

Hydrotalcite-like compounds have been used as catalysts in a variety of applications, such as catalysts for aldol condensation, polymerization of alkene oxides, hydrogenation catalysts, dehydrogenation catalysts, etc., as described in F. Cavani etal., Catalysis Today, Volume 11, pages 173–301, 1991. Cavani et al. discloses that coprecipitated Ni, Al-based catalysts have been recognized as satisfying all the requirements for operation in steam reforming for methane production, and that coprecipitated catalysts calcined at 723° K. (450° C.) and reduced at 723° K. were active in the 673°–923° K. (450° C.–650° C.) range for steam cracking of naphtha to produce methane. U.S. Pat. No. 3,865,753 to Broecker et al. discloses the use of a catalyst prepared by calcining $[Ni_5MgAl_2(OH)_{16}]CO_3 \cdot 4H_2O$ at a temperature in the range of 350° C. to 550° C., and which is subsequently reduced with hydrogen. Such a catalyst was used for the steam cracking of hydrocarbons having 2 to 30 carbon atoms at a temperature in the range of 300° to 450° C. to form methane. Ross et al., J. of Catalysis, Volume 52, pages 280–290, 1978, have examined the reaction of methane with water over a catalyst derived from $Ni_6Al_2(OH)_{16}CO_3 \cdot 4H_2O$ at temperatures of 873°–973° K. (600° C. –700° C.). Kruissink et al., J. Chemical Society, Faraday Trans. I, Volume 77, 649–663, 1981, discusses the thermal treatment of nickel-containing compositions having x-ray patterns characteristic of the hydrotalcite-like minerals; and Hernandez et al., Thermochemica Acta, Volume 81, 311–318, 1984, investigated the thermal decomposition of hydrotalcite-like compounds of formula $[Ni_{(1-x)}Al_x(OH)_2]^{x+}X^n{}_{x/n} \cdot mH_2O$ where $0.25 \leq x \leq 0.33$ and X is carbonate and sulfate. Using x-ray diffraction studies, these researchers identified nickel oxide as the decomposition product at temperatures above 600° C., whereas the corresponding spinel, $NiAl_2O_4$, was formed at temperatures higher than 1000° C. British Patent 1,342,020, discloses catalysts having chemical composition $Ni_6Al_2CO_3(OH)_{16} \cdot 4H_2O$ and $Ni_3Mg_3Al_2CO_3(OH)_{16} \cdot 4H_2O$ and discloses that they have an application as hydrogenation, dealkylation and cracking catalysts. Clause et al, J. of Catalysis, Volume 133, 231–246 (1992) discloses the preparation and analysis of nickel-aluminum mixed oxides obtained by thermal decomposition of hydrotalcite-type precipitates. This paper also discloses that nickel-aluminum mixed oxides resulting from the thermal decomposition of hydrotalcite-like coprecipitates have been studied for steam reforming and methanation reactions.

SUMMARY OF THE INVENTION

In one aspect, this invention is a method for preparing synthesis gas comprising feeding a gaseous or vaporizable hydrocarbyl compound and an oxygen-containing gas to a suitable reaction zone containing a catalyst formed by heat treating a nickel containing hydrotalcite-like compound, and reacting the hydrocarbyl compound and the oxygen-containing gas in the presence of the catalyst at a temperature and at a pressure sufficient to form synthesis gas.

In another aspect, this invention is reforming catalysts formed by heat treating to temperatures of at least about 700° C. a catalyst precursor composition comprising at least one hydrotalcite-like compound having the formula:

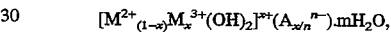

where $M^{2+}$ is a metal ion having a valence of 2+ and is at least $Ni^{2+}$ or preferably, a mixture of $Ni^{2+}$ and $Mg^{2+}$, optionally with one or more metals having a valence of 2+ and preferably selected from $Cu^{2+}$, $Co^{2+}$, $Zn^{2+}$, $Fe^{2+}$ or $Mn^{2+}$; $M^{3+}$ is a metal ion having a valence of 3+ and suitably selected from $Al^{3+}$, $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least $Al^{3+}$, optionally with one or more selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number of about 0.1 to about 0.50, wherein the value of x and (1–x) are obtained by combining all of the metal ions having a 3+ valence, and 2+ valence, respectively; $A^{n-}$ is an anion having a negative charge of n, and n can suitably be 1 to about 10; and m is 0 or a positive number. A mixture of anions can also be used.

In another aspect, this invention is a hydrotalcite-like catalyst precursor compound having the formula:

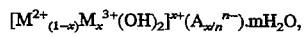

wherein $M^{2+}$ is a metal ion having a valence of 2+ and is at least a mixture of $Ni^{2+}$ and $Mg^{2+}$, optionally with one or more other metal ions having a valence of 2+, and preferably selected from $Cu^{2+}$, $Co^{2+}$, $Zn^{2+}$, $Fe^{2+}$ or $Mn^{2+}$; $M^{3+}$ is a metal ion having a valence of 3+ and is at least $Al^{3+}$, optionally with one or more other metal ions having a valence of 3+, and preferably selected from $Ga^{3+}$, $Ni^{3+}$, $Co^{3+}$, $Fe^{3+}$, $Mn^{3+}$, $Cr^{3+}$, $V^{3+}$, $Ti^{3+}$, $La^{3+}$ or $In^{3+}$; x is a number greater than about 0.25 to about 0.50; $A^{n-}$ is an anion having a negative charge n, wherein n can be 1 to about 10; and m is 0 or a positive number.

In still another aspect, this invention is a nickel-containing catalyst composition comprising a mixture of $M^{2+}O$, $M^{2+}Al_2O_4$ spinel, and a hybrid phase comprising a $M^{2+}O$ component and a $M^{2+}Al_2O_4$ spinel component in the same crystallite, wherein these components are joined to each other in the crystallite through an epitaxial interface. Catalyst having this hybrid phase component are highly active in the reforming method of this invention. $M^{2+}$ in this hybrid phase is at least $Ni^{2+}$ and can be a mixture of $Ni^{2+}$ and some other metal ion, preferably at least one other metal having a valence of 2+.

BRIEF DESCRIPTION OF THE FIGURES

FIG. 3 is a schematic representation of the structure of the nickel-containing catalysts of this invention under reforming conditions.

DETAILED DESCRIPTION OF THE INVENTION

Figure 1:
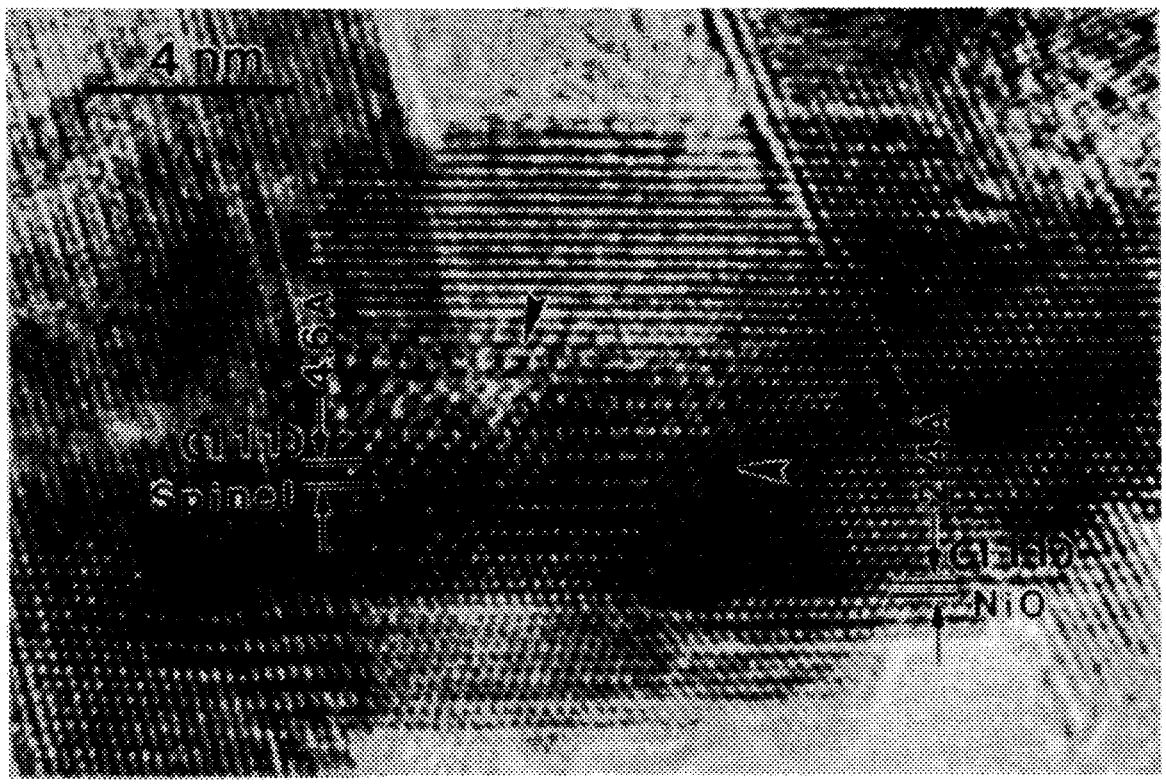
FIG. 1 is a photomicrograph, obtained using high resolution electron microscopy, of a catalyst of the invention after thermal activation of the catalyst under non-reforming conditions.

The catalytic materials useful in the method of this invention for preparing synthesis gas are suitably prepared by heat treating a catalyst precursor composition comprising one or more hydrotalcite-like compounds comprising the formula:

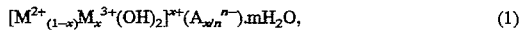

$$[M^{2+}{}_{(1-x)}M_x{}^{3+}(OH)_2]^{x+}(A_{x/n}{}^{n-}).mH_2O, \quad (1)$$

where $M^{2+}$ is $Ni^{2+}$ or a mixture of $Ni^{2+}$ and at least one other metal ion, preferably having a 2+ valence and more preferably selected from $Ca^{2+}$, $Cd^{2+}$, $Co^{2+}$, $Cu^{2+}$, $Fe^{2+}$, $Mg^{2+}$, $Mn^{2+}$, $Pd^{2+}$, $Pt^{2+}$, $Sr^{2+}$, $Ti^{2+}$, $V^{2+}$, $Zn^{2+}$ and $Zr^{2+}$. The atomic ratio of $Ni^{2+}$ to other metal ion or ions present having a 2+ charge is suitably in the range of about 100:1 to about 0.05:1, preferably 5:1 to about 0.1:1.

$M^{3+}$ in the formula above is at least one metal ion having a valence of 3+ and is preferably selected from $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$, $Tl^{3+}$, $V^{3+}$ and the trivalent lanthanum metal ions. Preferably $M^{3+}$ is at least $Al^{3+}$. When a mixture of $Al^{3+}$ and at least one other metal ion having a valence of 3+ are present, the atomic ratio of $Al^{3+}$ to the other $M^{3+}$ ion or ions present in suitably about 100:1 to about 0.05:1.

The anion, A, in the formula (1) above can be any anion that provides for a hydrotalcite-like structure and can be, for example, carbonate, nitrate, a halide (e.g. $Cl^-$, $Br^-$), chlorate, sulfate, hydroxide, oxide, carboxylates and polycarboxylates; particularly those having one to about 20 carbon atoms, including, for example, acetate, benzoate, the phthalates, and the like, phosphates, boron containing anions, metalates of metals from Group Vb of the Periodic Table of Elements, metalates of metals of Group VIb of the Periodic Table. Examples of borates and metalates include, $B(OH)_4{}^-$, $[B_3O_3(OH)_4]^-$, $[B_3O_3(OH)_5]^{2-}$, $[B_4O_5(OH)_4]^{2-}$, $V_2O_7{}^{4-}$, $HV_2O_7{}^{3-}$, $V_4O_{12}{}^{3-}$, $V_3O_9{}^{3-}$ and $V_{10}O_{28}{}^{6-}$. Examples of phosphates include $PO_4{}^{3-}$, $HPO_4{}^{2-}$ and $H_2PO_4{}^-$. Other anions that can be used include $Nb_6O_{19}{}^{8-}$, $NHb_6O_{19}{}^{7-}$, $H_2Nb_6O_{19}{}^{6-}$, $NbO_4{}^{3-}$, $Ta_6{}^{3-}$, $Ta_6O_{19}{}^{8-}$, $HTa_6O_{19}{}^{7-}$, $TaO_4{}^{3-}$, $Mo_7O_{24}{}^{6-}$, $HW_6O_{21}{}^{5-}$, and Keggin-type anions such as $PW_{11}O_{39}{}^{7-}$ and $SiW_{11}O_{38}{}^{7-}$ which are stable at a pH above above 6. The value x is about 0.1 to about 0.5, preferably 0.25 to about 0.45. The value n is suitably about 1 to about 10. The amount of water present in the hydrotalcite-like catalyst precursor is variable. The amount of water can be such that the value m in the formula above is about 0 to about 2.

For example, a hydrotalcite-like compound corresponding to $[Ni_{0.625}Cu_{0.125}Al_{0.25}(OH)_2]^{0.25}(CO_3)_{0.125} \cdot 0.5H_2$ is a suitable precursor compound for preparing an active catalyst for the reforming of methane according to the method of this invention. In this formula, Ni and Cu have a valence of 2+; Al has a valence of 3+; and x=0.25 and m is 0.5. However, it is more convenient to express this formula using whole numbers; therefore, if the fractional numbers are multiplied by 8, the same formula can be expressed as: $[Ni_5CuAl_2(OH)_{16}]CO_3 \cdot 4H_2O$. Specific formulas for the hydrotalcite-like compounds are represented herein using whole numbers. Another example of a suitable hydrotalcite-like catalyst precursor compound is $[NiZnMg_2Al_2(OH)_{12}]Mo_2O_7 \cdot 4H_2O$. In this compound, x=0.333, n=2, m =0.666, and the formula has been multiplied by 6 to convert the fractional numbers to whole numbers. Another example is a compound having formula $[Ni_4Zn_2Cu_2Mg_4Al_4(OH)_{32}]V_4O_{12} \cdot 8H_2O$. In this formula, x=0.25, n =4, m=0.5, and it has been multiplied by 16 to convert the fractional numbers in the formula to whole numbers.

Preferred hydrotalcite-like catalyst precursor compounds useful in the method of this invention are those compounds having the formula (1) above where $M^{2+}$ is $Ni^{2+}$, a mixture of $Ni^{2+}$ and $Mg^{2+}$, a mixture of $Ni^{2+}$ and $Cu^{2+}$ or a mixture of $Ni^{2+}$, $Cu^{2+}$ and $Mg^{2+}$ and where $M^{3+}$ is $Al^{3+}$. In these preferred catalyst precursor compositions, wherein a mixture of nickel and magnesium and/or copper are used, the molar ratio of $Ni^{2+}$ to $Mg^{2+}$ and/or $Cu^{2+}$ is in the range of about 1:100 to about 100:1. Specific examples of preferred hydrotalcite-like catalyst precursor compounds are: $[Ni_8Al_2(OH)_{20}]CO_3 \cdot yH_2O$; $[Ni_6Al_2(OH)_{16}]CO_3 \cdot yH_2O$; $[Ni_5MgAl_2(OH)_{16}]CO_3 \cdot yH_2O$; $[Ni_4Mg_2Al_2(OH)_{16}]CO_3 \cdot yH_2O$; $[Ni_3Mg_3Al_2(OH)_{16}]CO_3 \cdot yH_2O$; $[Ni_2Mg_4Al_2(OH)_{16}]CO_3 \cdot yH_2O$; $[NiMg_5Al_2(OH)_{16}]CO_3 \cdot yH_2O$; $[Ni_4Al_2(OH)_{12}]CO_3 \cdot yH_2O$; $[Ni_3MgAl_2(OH)_{12}]CO_3 \cdot yH_2O$; $[Ni_2Mg_2Al_2(OH)_{12}]CO_3 \cdot H_2O$; $[NiMg_3Al_2(OH)_{12}]CO_3 \cdot yH_2O$; $[Ni_{14}A_{16}(OH)_{40}](CO_3)_3 \cdot yH_2O$; $[Ni_{12}Mg_2Al_6(OH)_{40}](CO_3)_3 \cdot yH_2O$; $[Ni_1Mg_{13}Al_6(OH)_{40}](CO_3)_3 \cdot yH_2O$; $[Ni_3Al_2(OH)_{10}]CO_3 \cdot yH_2O$; $[Ni_2MgAl_2(OH)_{10}]CO_3 \cdot yH_2O$; $[Ni_1Mg_2Al_2(OH)_{10}]CO_3 \cdot yH_2O$; $[Ni_2Al_2(OH)_8]CO_3 \cdot yH_2O$; $[NiMgAl_2(OH)_8]CO_3 \cdot yH_2O$; $[Ni_2MgCuAl_2(OH)_{12}]CO_3 \cdot yH_2O$, $Ni_2Cu_2Al_2(OH)_{12}CO_3 \cdot yH_2O$; and the like, and where y in these formulas is 0–20.

A particularly preferred group of catalyst precursor compounds that are useful in the method of this invention are those hydrotalcite-like compounds having the formula (1) above where $M^{2+}$ is a mixture of $Ni^{2+}$ and $Mg^{2+}$, but can also contain one or more other metal ions having a 2+ valence, and preferably selected from $Cu^{2+}$, $Co^{2+}$, $Zn^{2+}$, Fe2+ or $Mn^{2+}$; $M^{3+}$ is a metal ion having a valence of 3+ and is at least $Al^{3+}$, optionally with one or more other metal ion having a valence of 3+, and preferably selected from $Ga^{3+}$, $Ni^{3+}$, $Co^{3+}$, $Fe^{3+}$, $Mn^{3+}$, $Cr^{3+}$, $V^{3+}$, $In^{3+}$; x is a number greater than about 0.25, more preferably greater than about 0.28 to about 0.50, more preferably to about 0.45; $A^{n-}$ is an anion, for example, as described above, having a negative charge n, and m is 0 or a positive number. Catalyst formed from these precursor compounds demonstrate higher activity and superior resistance to coke formation during the reforming reaction disclosed herein.

Another particularly preferred group of catalyst precursor compounds are those hydrotalcite-like compounds having formula (1) where $M^{2+}$ is at least, and preferably is, a mixture of $Ni^{2+}$ and $Cu^{2+}$, and where $M^{3+}$ is at least $Al^{3+}$ and preferably is $Al^{3+}$; where x is about 0.1 to about 0.5, preferably about 0.25 to about 0.45; A is an anion, preferably as discussed hereinabove, having negative charge n; and m is 0 or a positive number, preferably 0–2.

The hydrotalcite-like catalyst precursor compounds described herein are activated through heat treatment, i.e. they are thermally activated. The heat treatment is typically conducted by subjecting the hydrotalcite-like compound to a temperature of at least 700° C., more preferably at least about 800° C., for a time sufficient to convert the hydrotalcite-like catalyst precursor compound into an active catalyst for the reforming of hydrocarbyl compounds. This heating can be done prior to using the catalyst precursor for a reforming reaction, or it can be done in the reactor apparatus used for the reforming reaction, preferably under reforming conditions. For example, the temperature used for the reforming reactions are typically sufficiently high to activate the catalyst precursor compounds. During the heat treatment to form the active catalyst, the hydrotalcite-like compounds first lose water that is located between the hydroxide layers. This typically occurs at temperatures in the range of about 200° to about 250° C. This is a reversible reaction, however, since the dehydrated hydrotalcite-like compositions can be again hydrated to restore their original hydrotalcite-like structures. Upon heating to higher temperatures, for example, temperatures in excess of 450° C., another change occurs in the catalyst precursor where there is a loss of the anion, if it is volatile, or, for example, the anion loses water if it is not volatile. However, this transformation does not irreversibly destroy the layer structure of the hydrotalcite-like composition since a layer structure can be restored by replacing the anion or hydrating the anion. Upon heating to still higher temperatures, for example, temperatures in excess of about 700° C., there is an irreversible loss of layer structure, and these heat-activated compositions are the active catalysts for the reforming of hydrocarbyl compounds according to the method of this invention.

We have determined that when the nickel-containing hydrotalcite-like catalyst precursor compounds disclosed herein are heated or thermally-activated at temperatures of at least about 700° C., preferably in the range of about 800° C. to about 1050° C., a new hybrid phase component is formed. Evaluation of heat treated $[Ni_4Al_2(OH)_{12}]CO_3 \cdot 4H_2O$ and $[Ni_2Mg_2Al_2(OH)_{12}CO_3 \cdot 4H_2O$ compounds by High Resolution Transmission Electron Microscopy showed that the heat-treated samples contain a new hybrid phase comprising a mixture of NiO or NiO/MgO, and $NiAl_2O_4$ spinel or $NiAl_2O_4/MgAl_2O_4$ spinel or $Ni/MgAl_2O_4$ spinel in the same crystallite, wherein the NiO or NiO/MgO phase and the spinel phase are joined in the same crystallite by an epitaxial interface. By epitaxial interface, we mean an area in a single crystallite where, between two distinct crystalline species in the same crystallite, the two crystalline species coexit and yet form a well defined interface. Catalyst compositions containing this hybrid phase are highly active in the reforming method of this invention. Thus, this invention is a catalyst composition comprising a hybrid catalyst component comprising a $M^{2+}$ component and a $M^{2+}Al_2O_4$ spinel component in the same catalyst crystallite, wherein the $M^{2+}O$ component of the crystallite and the $M^{2+}Al_2O_4$ component of the crystallite are joined through an epitaxial interface. $M^{2+}$ in this hybrid catalyst component is at least $Ni^{2+}$ and can be $Ni^{2+}$ and some other metal ion, preferably having a valence of 2+, and preferably selected from $Mg^{2+}$, $Cu^{2+}$, $Co^{2+}$; $Zn^{2+}$, $Fe^{2+}$ or $Mn^{2+}$. These crystallites comprising the hybrid phase are typically about 5 to about 400 nm in size, preferably 5 to about 100 nm in size. This catalyst composition comprising the hybrid phase can be prepared by heating one or more of the herein described nickel-containing hydrotalcite-like precursor compounds to a temperature in the range of about 800° C. to about 1050°, and preferably by heating a nickel-containing hydrotalcite-like catalyst precursor compound wherein the $M^{2+}$ metal ion in the formula $[M^{2+}{}_{(1-x)}M^{3+}{}_x(OH)_2]^{x+}(A_{a/x}{}^{n-}) \cdot mH_2O$ is at least $Ni^{2+}$ or preferably a mixture of $Ni^{2+}$ and $Mg^{2+}$, and wherein $M^{3+}$ is at least $Al^{3+}$.

The preferred catalyst compositions of this invention for preparing synthesis gas are those compositions formed by heat treating one or more hydrotalcite-like compounds having the formula:

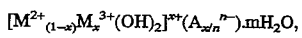

$$[M^{2+}{}_{(1-x)}M_x{}^{3+}(OH)_2]^{x+}(A_{x/n}{}^{n-}) \cdot mH_2O,$$

where $M^{2+}$ is a metal ion with a valence of 2+ and is at least $Ni^{2+}$ or, preferably, a mixture of $Ni^{2+}$ and $Mg^{2+}$, optionally with one or more metal ions having a valence of 2+ and preferably selected from $Cu^{2+}$, $Co^{2+}$, $Zn^{2+}$, $Fe^{2+}$ or $Mn^{2+}$, more preferably selected from $Cu2+$ or $Zn^{2+}$; where $M^{3+}$ is a metal ion having a valence of 3+ and is suitably selected from at least one of $Al^{3+}$, $Ga^{3+}$, $Ni^{3+}$, $CO^{3+}$, $Fe^{3+}$, $Mn^{3+}$, $Cr^{3+}$, $V^{3+}$, $Ti^{3+}$, $La^{3+}$ or $In^{3+}$, preferably $M^{3+}$ is at least $Al^{3+}$, optionally with one or more selected from the $Ga^{3+}$, $Ni^{3+}$, $Co^{3+}$, $Fe^{3+}$, $Mn^{3+}$, $Cr^{3+}$, $V^{3+}$, $Ti^{3+}$, $La3+$ or $In^{3+}$, and, most preferably, $M^{3+}$ is $Al^{3+}$; where x is a number of about 0.1 to about 0.50, preferably 0.25 to about 0.45, wherein the value x and (1−x) are obtained by combining all of the metal ions having a 3+ valence, and 2+ valence, respectively, where the anion $A^{n-}$ is an anion having a negative charge of n and is an anion that provides for a hydrotalcite-like structure, and is suitably selected from carbonate, nitrate, a halide, sulfate, chlorate, hydroxide, oxide, carboxylate, phosphates, boron containing anions, Group Vb and VIb metalates, and the like, and, preferably, A is carbonate; and where the value of m is 0 or a positive number, preferably 0 to about 2. Particularly, preferred catalyst compositions are those herein above described hydrotalcite-like compounds that have been exposed to the reactants and reaction conditions used for the preparation of synthesis gas by the reaction of a hydrocarbyl compound with molecular oxygen, or by the reaction of a hydrocarbyl compound with carbon dioxide.

A preferred group of anions useful in the hydrotalcite-like compounds used to make catalysts is the group consisting of molybdates and polyoxomolybdates, for example $Mo_7O_{24}{}^{6-}$, $MoO_4{}^{2-}$, $MoO_4{}^-$, and the like. These molybdates and polyoxomolybdates are preferred because they will impart coke reducing capability to the catalyst composition of this invention.

The hydrotalcite-like precursor compounds used in the method of this invention can be prepared by using procedures known in the art. However, one procedure for preparing these hydrotalcite-like compounds comprises combining in solution, preferably in aqueous solution, a nickel 2+ compound, optionally with one or more of the other metal ions discussed hereinabove having a 2+ valence, with one or more metal ions as described hereinabove having a 3+ valence. Suitable metal compounds are the nitrates, chlorides, sulfates, and the like. The solution containing the 2+ and 3+ metal ion is combined with a solution of the desired anion, A, or a precursor to the anion. For example, A may be $CO_3{}^{2-}$, $SO_4{}^{2-}$, $Cl^-$, etc. An anion precursor is a compound which produces the desired anion under the reaction conditions used to prepare the hydrotalcite-like compound. For example, $NaVO_3$ is a precursor to the anion $V_2O_7{}^{4-}$ because, at a reaction mixture pH of 10–11, $NaVO_3$ yields $V_2O_7^{4-}$. The pH dependent behavior of some transition element metalates is described in Kepert, D. L., "The Early Transition Metals," Academic Press, London (1972).

Additionally, the pH of the reaction mixture used to form the hydrotalcite-like precipitate should be such that all of the $M^{2+}$ and $M^{3+}$ ions selected for a particular hydrotalcite-like composition are incorporated in the coprecipitate. The table presented below shows the approximate pH ranges in which hydrotalcite-like compounds are formed for a selection of metal ions.

| Divalent Metal Ion | Trivalent Metal Ion | Approximate pH Range |
| --- | --- | --- |
| $Mg^{2+}$ | $Al^{3+}, Fe^{3+}, Cr^{3+}, Bi^{3+}, Mn^{3+}, Co^{3+}$ | 8 to 12–14 |
| $Cu^{2+}$ | $Al^{3+}, Fe^{3+}, Cr^{3+}, Bi^{3+}, Mn^{3+}, Co^{3+}$ | 6 to 12–13 |
| $Co^{2+}$ | $Al^{3+}, Fe^{3+}, Cr^{3+}, Bi^{3+}, Mn^{3+}, Co^{3+}$ | 8 to 12–13 |
| $Zn^{2+}$ | $Al^{3+}, Fe^{3+}, Cr^{3+}, Bi^{3+}, Mn^{3+}, Co^{3+}$ | 7 to 10–11 |
| $Ni^{2+}$ | $Al^{3+}, Fe^{3+}, Cr^{3+}, Bi^{3+}, Mn^{3+}, Co^{3+}$ | 6 to 12–13 |
| $Mn^{2+}$ | $Al^{3+}, Fe^{3+}, Cr^{3+}, Bi^{3+}, Mn^{3+}, Co^{3+}$ | 9 to 12–14 |
| $Fe^{2+}$ | $Al^{3+}, Fe^{3+}, Cr^{3+}, Bi^{3+}, Mn^{3+}, Co^{3+}$ | 7 to 12–14 |

For example, in order to prepare a nickel/aluminum hydrotalcite-like compound having a carbonate anion, the nickel and aluminum salt are combined in water and then added tea carbonate containing solution. From the table above, the approximate pH range to produce the hydrotalcite-like compound is about 6–12. Similarly, if a copper-nickel-aluminum containing hydrotalcite-like compound is desired, the pH range needs to be 6 to 12. If the desired anion, $A^{n-}$, is not stable at this pH range, then the hydrotalcite-like structures will not form. If the pH of the reaction mixture used to form the hydrotalcite-like compound requires adjustment, a base such as ammonium hydroxide, an alkali metal hydroxide or a tetralkylammonium hydroxide can be used. If an acid is required to adjust the pH, a mineral acid such as nitric acid or hydrochloric acid can be used. Also, after the proper pH has been achieved, the solution generally requires heating for a period of time, preferably at a temperature of about 40° to 90° C., to accelerate the formation of the hydrotalcite-like precipitate, which can be collected by filtration.

The molar ratio of the 2+ metal ions to 3+ metal ions is preferably about 9:1 to about 1:1. The mole ratio of the anion used to the total of 2+ and 3+ metal ions depends on the charge on the anion to be incorporated. For each metal ion with a 3+ valence, a corresponding negative charge in the anion layer of the hydrotalcite-like compound is required. Generally, a molar excess of anion is used during the preparation of the hydrotalcite-like compound in order to ensure complete reaction.

The 2+ metal ion and 3+ metal ion compounds are optimally mixed together and added slowly, with stirring, to a warmed solution of the anion. As stated above, the resulting solution must have the proper pH. Slower addition and a more elevated temperature (a pressure vessel can be used) tends to produce a product with larger crystals.

Copending U.S. patent application Ser. No. 07/745,902, filed on Aug. 16, 1991, to Bhattacharyya et al., also discloses the preparation of hydrotalcite-like compounds and the specification of this copending application is hereby specifically incorporated by reference.

In the preferred reforming method of this invention, a vaporizable hydrocarbyl compound and an oxygen containing gas comprising molecular oxygen or carbon dioxide are fed to a suitable reaction zone, which zone contains a catalyst formed by heat treating one or more of the nickel-containing hydrotalcite-like compounds described hereinabove, and reacting the hydrocarbyl compound and the oxygen-containing gas in the presence of the reforming catalyst at reaction conditions sufficient to produce synthesis gas in the form of a mixture of molecular hydrogen and carbon monoxide. The mole ratio of hydrogen to carbon monoxide may vary, however, it is suitably in the range of about 0.1:1 to about 5:1.

The hydrocarbyl compound used in the method of this invention suitably comprises one or more gaseous or vaporizable compounds that can be reacted with molecular oxygen or carbon dioxide to form synthesis gas. Most suitably, the hydrocarbyl compound is a hydrocarbon, however, various amounts of oxygen or other atoms can also be in the hydrocarbyl molecule. For example, hydrocarbyl compounds that can be converted to synthesis gas include methanol, dimethylether, ethylene oxide, and the like. However, the most preferable hydrocarbyl compounds are the low molecular weight hydrocarbons containing about 1 to about 20 carbons, more preferably 1 to about 10 carbon atoms. Methane and natural gas, which is mainly methane, are readily available, inexpensive, and are the most preferred hydrocarbyl feed materials for the method of this invention. Mixtures of hydrocarbyl and/or hydrocarbon compounds can also be used.

The oxygen-containing gas used in the method of this invention preferably is either a gas comprising molecular oxygen or a gas comprising carbon dioxide. The gas comprising molecular oxygen is used in the method of this invention for preparing synthesis gas by the oxidation of the hydrocarbyl compound to synthesis gas. When methane is the hydrocarbyl compound, this reaction proceeds according to the partial-oxidation reaction described in the following equation:

$$CH_4 + \tfrac{1}{2}O_2 \rightarrow CO + 2H_2.$$

The oxygen-containing gas used in the method of this invention can be pure molecular oxygen or a mixture of molecular oxygen with one or more other gases such as nitrogen, helium, or some other inert gas. Air is a suitable source of molecular oxygen. The molecular oxygen can be in the oxygen-containing gas at a level of about 1% to about 100%, preferably about 20 to about 100%, most preferably the molecular oxygen containing gas is substantially pure, e.g. 98%, or pure, e.g. +99% molecular oxygen.

The amount of molecular oxygen relative to the hydrocarbyl compound fed to the reactor containing the catalyst derived from the nickel-containing hydrotalcite-like catalyst precursor is such that there is sufficient oxygen to form synthesis gas. When methane is used the molar ratio of molecular oxygen to methane in the feed compound added to the reaction zone is about 1:2. However, when high selectivity to synthesis gas is desired, the ratio of molecular oxygen to methane is about 1:2.1, and when complete methane conversion is desired, the optimal ratio of molecular oxygen to methane is about 1:1.9.

In the method of this invention wherein a hydrocarbyl compound is reacted with molecular oxygen to form synthesis gas, the reaction temperature is suitably in the range of about 400° to about 1000° C., more preferably about 600° to about 900° C. Additionally, since the reaction of the hydrocarbyl compound with molecular oxygen is exothermic, the heat produced by the process can be used as an energy source to operate other processes in a chemical manufacturing plant. For example, it can be used to generate high pressure steam. The pressure for the reaction of a hydrocarbyl compound with molecular oxygen is suitably in the range of about 0.1 atmospheres absolute to about 50 atmospheres absolute, preferably about 25 atmospheres absolute to about 40 atmospheres absolute. The space velocity is suitably that which provides for the conversion of a major portion of the hydrocarbyl feed to synthesis gas, and preferably the volumetric space velocity is in the range of about 10 $hr^{-1}$ to about $1\times10^9$ $hr^{-1}$, more preferably about 1200 to about $1\times10^6$ $hr^{-1}$. The volumetric space velocity being calculated based on the total volume of reactant gases, i.e. the gaseous hydrocarbyl feed component and the molecular-oxygen containing gas component, and the volume of the catalyst in the reactor.

Although other feed materials can be added along with the molecular oxygen-containing gas and the hydrocarbyl feed compound, for example, water or steam, it is generally not necessary to do so. One of the advantages of the method of this invention wherein a hydrocarbyl compound is converted to synthesis gas by reaction with molecular oxygen, is that the nickel-containing catalysts derived from the hydrotalcite-like catalyst precursor compounds are very resistant to coke formation. Therefore, it is not essential to add steam or water to eliminate coking of the catalyst. However, steam or water can be added in order to adjust the ratio of $H_2$ to CO in the synthesis gas product.

In the method of this invention wherein a gas comprising carbon dioxide is reacted with a hydrocarbyl compound, the gas comprising carbon dioxide is suitably about 1 to about 100% carbon dioxide, more preferably about 20 to about 100% carbon dioxide, and most preferably it is substantially pure carbon dioxide. The gas comprising carbon dioxide can contain other gases, for example, nitrogen, helium, argon and the like, however, as stated above, it is preferable to use substantially pure carbon dioxide.

In the method of this invention wherein hydrocarbyl compounds are reformed to synthesis gas using carbon dioxide, the addition of water or steam is beneficial to reduce the coking of the catalyst. The amount of steam present should be an amount sufficient to control the formation and deposition of coke on the catalyst so that deactivation does not occur. Preferably, the amount of water in the form of steam is suitably about 10 to about 50 percent of the feed gases, more preferably about 20 to about 30 percent of the total feed gas. Other materials can be added to the total feed gasses to promote the longevity of the catalyst. For example, hydrogen sulfide, or other source of sulfur, preferably a volatile source of sulfur, can be added along with the feed gas to the carbon dioxide reforming reaction. If used, hydrogen sulfide or other volatile sulfur-containing compound, e.g. an alkyl thiol, dialkyl sulfide or dialkyl disulfide, is present in the feed at a level of about 10 parts per million by weight to about 100 parts per million by weight, based on the total feed gas. However, we have determined that the catalysts of this invention are effective for reforming hydrocarbyl compounds without the use of a sulfur-containing compound in the feed gas.

The amount of carbon dioxide relative to the hydrocarbyl compound fed to the reactor containing the catalyst derived from the nickel-containing, hydrotalcite-like catalyst precursor is such that there is sufficient carbon dioxide to effectively convert the hydrocarbyl compound to synthesis gas. Suitably, the molar ratio of carbon dioxide to carbon in the hydrocarbyl feed compound is at least about 0.8:1, preferably about 1:1 to about 5:1, most preferably about 1:1 to about 2:1.

The reaction temperature for the reforming of a hydrocarbyl compound using carbon dioxide is suitably in the range of about 750° to about 950° C., more preferably about 850° to about 900° C. The pressure for the reaction of the hydrocarbyl compound with carbon dioxide is suitably in the range of about 0.1 atmosphere absolute to about 50 atmospheres absolute, more preferably about 10 atmospheres absolute to about 35 atmospheres absolute. The space velocity for this reaction is suitably that which provides for the conversion of a major portion of the hydrocarbyl compound, preferably methane, to synthesis gas. Suitable volumetric space velocities are in the range of 1000 $hr^{-1}$ to about $1\times10^6$ $hr^{-1}$, more preferably about $1\times10^4$ $hr^{-1}$ to about $1\times10^{-1}$. The volumetric space velocity being calculated based on the total volume of gas entering the reactor containing the catalyst and the volume of the catalyst.

The nickel-containing compounds described herein prepared by heat treating the nickel-containing hydrotalcite-like compounds can also be used for the steam reforming of a hydrocarbyl compound where water is the oxygen-containing gas. Preferably the hydrocarbyl compound is methane or natural gas. The reaction temperature for the steam reforming reaction is suitably at least about 700° C. and is preferably in the range of about 800° C. to about 1000° C. The pressure is suitably at least about 0.1 to about 75 atmosphere absolute. The space velocity of the feed gas for the steam reforming reaction is suitably that which provides for the conversion of the major portion of the hydrocarbyl compound to synthesis gas. Suitable volumetric space velocities are in the range of about 1000 $hr^{-1}$ to about $1\times10^6$ $hr^{-1}$, preferably about $1\times10^4$ $hr^{-1}$ to about $1\times10^5$ $hr^{-1}$. The volumetric space velocity being calculated based on the total volume of gas entering the reactor containing the catalyst and the volume of the catalyst. The mole ratio of water-to-carbon in the feed gas is suitably about 10:1 to about 2:1; preferably about 8:1 to about 3:1. However, an advantage of the catalysts of this invention is that they do not readily form coke. Consequently, molar ratios of water (steam) to carbon in the hydrocarbyl portion of the feed can be low; for example, less than about 2:1, more preferably less than about 1.6:1, most preferably about 1:1. Preferably, the mole ratio of water to carbon in the feed gas is at least about 0.5:1. The ability to use low molar ratios of water to carbon is desirable because the synthesis gas product has a low ratio of hydrogen-to-carbon monoxide.

The active reforming catalysts of this invention formed during the reforming reaction described herein comprises metal particles comprising at least nickel metal (nickel in the zero oxidation state) and optionally containing one or more metals selected from Cu, Co, Fe, Mn, Pd, Pt and Zn in the zero oxidation state, wherein the zero oxidation state metal particles are mostly, more preferably substantially, and most preferably completely surrounded by crystallites having a spinel structure. The spinel crystallites comprise either $M^{3+}{}_2O_3$ and/or $M^{2+}M_2{}^{3+}O_4$ where $M^{2+}$ is a metal in the +2 oxidation state and is preferably at least one of $Mg^{2+}$, $Zn^{2+}$, $Ni^{2+}$, $Fe^{2+}$, $Cu^{2+}$, $Co^{2+}$, $Mn^{2+}$, $Pd^{2+}$ or $Pt^{2+}$, and $M^{3+}$ is a metal in the +3 oxidation state and is preferably at least one of $Al^{3+}$, $B^{3+}$, $Cr^{3+}$, $Fe^{3+}$, $Ga^{3+}$, $In^{3+}$, $La^{3+}$, $Ni^{3+}$, $Co^{3+}$, $Mn^{3+}$, $Rh^{3+}$, $Ti^{3+}$, and $V^{3+}$ ions. Most preferably, the $M^{3+}$ in the spinels is $Al^{3+}$ and most preferably $M^{2+}$, if present, is $Mg^{2+}$. The metal particles are suitably in the range of about 1 to about 1000 nanometers (nm) in size, preferably about 10 to about 500 nm in size. The atomic ratio of nickel to other metals, if present, in the metal particles is suitably in the range of about 100:1 to about 0.05:1, preferably about 5:1 to about 0.1:1. The spinel crystallites are suitably no more than about 200 nm in size, preferably no more than about 60 nm in size. Most preferably, the spinel crystallites are about 5 to about 30 nm in size. The mole ratio of the metals in the zero oxidation state to the spinel in the active reforming catalyst is typically about 20:1 to about 1:20. As used in this description of the spinel crystallites surrounding the active reforming catalyst, "mostly" means, on average, at least 50% of the exterior surface area of the metal particles; "substantially" means, on average, at least 80% of the exterior surface area of the metal particles; and "completely" means, on average, 95–100% of the surface area of the metal particles. As used in this description of the active reforming catalyst, "crystallite" means small crystals. Spinels are well-known crystal structures and are described, for example, in A. F. Wells', "Structural Inorganic Chemistry," Claredon Press, Oxford, 1987. The active reforming catalyst is most suitably prepared by treating, under reforming reaction conditions as described herein, the nickel-containing hydrotalcite-like compositions described herein.

The type of reactor used in the method of this invention is any type reactor that can be used to conduct a gas phase reaction over a heterogeneous, solid catalyst. For example, a fixed bed reactor, a fluidized bed reactor and the like.

The catalyst compositions described herein above can be used as such, or they can be supported on one or more inert support materials such as alpha alumina, silica, and the like. Preferably the catalyst composition, either supported or unsupported, are formed into shapes that are suitable for use in gas-phase reaction vessels, e.g. spheres, cylinders, rings, etc.

DETAILED DESCRIPTION OF THE FIGURES

FIG. 1 is a photomicrograph of a nickel-containing catalyst of this invention. The photomicrograph was obtained using a JEOL JEM 2000 EX high resolution electron microscope operating at 200 kv. Thin sections (about 20–40 nanometers in thickness) of the catalyst were used for the analysis. This figure shows the [011] projection of a typical microcrystal in the catalyst. In the center portion of the crystal, there is the coexistence of two phase domains, an NiO face center cubic structure (FCC, crystal symmetry Fm3m) with a lattice constant of a=4.18 Angstroms, and $NiAl_2O_4$ which has a spinel structure (crystal symmetry Fd3m) with lattice constant of a=8.05 Angstroms. (The lattice constants were calculated from the data in the photomicrograph.) The two phases are epitaxally related ([1,1,1] NiO is parallel to [1,1,1] spinel), and the epitaxial interfaces are indicated by the arrows. The catalyst composition shown in FIG. 1 was obtained by calcining a $Ni^4Al_2OH_{12}CO_3.4H_2O$ hydrotalcite-like compound at 850° C. in air. This composition corresponds to that of Example 8.

Figure 2:
FIG. 2 is a photomicrograph, obtained using high resolution electronmicroscopy, of a catalyst of this invention after use as a reforming catalyst.

FIG. 2 is a photomicrograph (obtained using the same instrument as described for FIG. 1) of a thin section of the catalyst shown in FIG. 1 after the catalyst was used for one day as a $CO_2$ reforming catalyst for the conversion of methane to synthesis gas. This figure shows that the structure has changed to comprise metallic nickel particles (FCC, crystal symmetry Fm3m, and a=3.52 Angstroms). The nickel particles are surrounded or "decorated" by crystallites of alumina spinel (Fd3m, a=7.911 Angstroms) 10 to 20 nanometers (nm) in size. The arrows point out a twin in one of the nickel particles.

FIG. 3 depicts, in schematic form, the structure of the nickel-containing catalysts of this invention during use as a $CO_2$ reforming catalyst. The schematic represents the results of actual analyses using electron microscopy as described above. As described for FIG. 2, the catalyst after one day comprises nickel metal particles typically 25–200 nm in size. The nickel particles show some evidence of coke; i.e., about 1 in 20 nickel particles exhibits a very minor coating of graphitic carbon. The particles exhibiting the slight coating of graphitic carbon are typically those particles that are not surrounded by spinel crystallites. As described above for FIG. 2, the nickel particles are decorated with alumina spinel crystallites. The catalyst after one day also contains a minor amount of hexagonal plates of aluminum oxide. After 5 days of catalyst use, the nickel particles have increased somewhat in size to 50–400 nm. However, coking of the nickel particles actually diminished. Thus, the catalyst demonstrated a surprising resistivity to coke formation. After 14 days on stream, coke formation was still low as with the 5-day catalyst. The nickel particles remained 50–400 nm in size. The catalyst also contained a minor amount of hexagonal plates of aluminum oxide. The unique structure of the catalyst, wherein the nickel particles are decorated with the alumina spinel, appears to contribute to the low coking of the nickel metal sites.

The following examples are being presented to illustrate certain embodiments of the invention disclosed herein; however, they should not be construed as limiting the scope thereof.

EXAMPLES

Example 1

A 1 L, 3-neck round bottom flask equipped with a thermometer, reflux condenser, and mechanical stirrer was charged with 400 mL deionized water, 7.95 g (0.075 mol) of $Na_2CO_3$, and 24.0 g (0.6 mol) of NaOH pellets. A second solution containing 10.91 g (0.0375 mol) of $Ni(NO_3)_2.6H_2O$, 48.08 g (0.1875 mol) of $Mg(NO_3)_2.6H_2O$ and 28.14 g (0.075 mol) of $Al(NO_3)_3.9H_2O$, and 375 mL of water was prepared and added dropwise to the first solution while stirring for a period of about 1 hour. After addition was complete, the gelatinous mixture (pH=8.9) was heated for about 15 hrs. at 80°–85° C. The cooled mixture was filtered, washed repeatedly with water, and dried overnight under vacuum at 70° C. The XRD of the material showed a typical hydrotalcite-like structure with d(001) value of 7.7Å. This material corresponds to the formulation $[NiMg_5Al_2(OH)_{16}]CO_3.4H_2O$.

Example 2

The material described in Example 1 was calcined by placing a weighed amount of the material in a calciner and raising the temperature at 20° C./min. until a temperature of 450° to 500° C. was reached. The material was kept at that temperature for about 15 hours and then sieved to different mesh sizes. These sized materials were further calcined at 850° C.

Example 3

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 10.91 g (0.0375 mol) of $Ni(NO_3)_2.6H_2O$, 28.85 g (0.1125 mol) of $Mg(NO_3)_2.6H_2O$ and 28.14 g (0.075 mol) of $Al(NO_3)_3.9H_2O$, and 375 mL of water was prepared and added dropwise to the first solution while stirring for a period of about 1 h. The rest of the preparation was similar to Example 1. This material corresponds to the formulation $NiMg_3Al_2(OH)_{12} CO_3.4H_2O$.

Example 4

The material described in example 3 was calcined by placing a weighed amount of the material in a calciner and raising the temperature at 20° C./min. until a temperature of 450° to 500° C. was reached. The material was kept at that temperature for about 15 h and then sieved to different mesh sizes. These sized materials were further calcined at 850° C.

Example 5

A 1 L, 3-neck round bottom flask equipped with a thermometer, reflux condenser, and mechanical stirrer was charged with 400 mL deionized water, 10.6 g (0.1 mol) of $Na_2CO_3$, and 24.0 g (0.6 mol) of NaOH pellets. A second solution containing 29.08 g (0.1 mol) of $Ni(NO_3)_2.6H_2O$, 25.64 g (0.1 mol) of $Mg(NO_3)_2.6H_2O$ and 37.51 g (0.1 mol) of $Al(NO_3)_3.9H_2O$, and 375 mL of water was prepared and added dropwise to the first solution while stirring for a period of about 1 hour. After addition was complete, the gelatinous mixture (pH=8.5) was heated for about 15 hours at 80°–85° C. The cooled mixture was then filtered, washed repeatedly with water, and dried overnight under vacuum at 70° C. The XRD of the material showed a typical hydrotalcite-like structure with d(001) value of 7.6Å. This material corresponds to the formulation $[Ni^2Mg_2Al_2OH_{12}]CO_3.4H_2O$.

Example 6

The material described in example 5 was calcined by placing a weighed amount of the material in a calciner and raising the temperature at 20° C./min. until a temperature of 450° to 500° C. was reached. The material was kept at that temperature for about 15 hours and then sieved to 12–20 mesh. This material was further calcined at 850° C. The XRD pattern of this catalyst shows only weak peaks due to NiO.

Example 7

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 43.62 g (0.15 mol) of $Ni(NO_3)_2.6H_2O$ and 28.13 g (0.075 mol) of $Al(NO_3)_3.9H_2O$, and 375 mL of water was prepared and added dropwise to the first solution while stirring for a period of about 1 hour. After addition was complete, the gelatinous mixture was heated for about 15 hours at 80°–85° C. The cooled mixture was then filtered, washed repeatedly with water, and dried overnight under vacuum at 70° C. The XRD of the material shows typical hydrotalcite-like structure with d(001) value of 7.6Å. This material corresponds to the formulation $[Ni^4Al_2(OH)_{12}]CO_3.4H_2O$.

Example 8

The material described in Example 7 was calcined by placing a weighed amount of the material in a calciner and raising the temperature at 20° C./min. until a temperature of 450° to 500° C. was reached. The material was kept at that temperature for about 15 hours and then sieved to 12–20 mesh. The XRD pattern of this material shows some weak peaks due to NiO. Further calcination of this material up to a temperature of about 850° C. did not change the nature of this material as evident from the XRD.

Example 9

A 1 L, 3-neck round bottom flask equipped with a thermometer, reflux condenser, and mechanical stirrer was charged with 400 mL deionized water, 5.30 g (0.05 mol) of $Na_2CO_3$, and 18.0 g (0.45 mol) of NaOH pellets. A second solution containing 43.62 g (0.15 mol) of $Ni(NO_3)_2.6H_2O$ and 18.76 g (0.05 mol) of $Al(NO_3)_3.9H_2O$, and 375 mL of water was prepared and added dropwise to the first solution while stirring for a period of about 1 h. After addition was complete, the gelatinous mixture (pH=8.2) was heated for about 15 h at 80°–85° C. The cooled mixture was then filtered, washed repeatedly with water, and dried overnight under vacuum at 70° C. The XRD of the material showed a typical hydrotalcite-like structure with d(001) value of about 7.9Å. This material corresponds to the formulation $Ni^6Al_2(OH)_{16}CO_3.4H_2O$.

Example 10

The material described in Example 9 was calcined by placing a weighed amount of the material in a calciner and raising the temperature at 20° C./min. until a temperature of 450° to 500° C. was reached. The material was kept at that temperature for about 15 h and then sieved to different mesh sizes. These sized materials were further calcined at 850° C.

Example 11

A synthesis very similar to that of Example 9 was performed with the exception that the amount of $Ni(NO_3)_2.6H_2O$ used was 0.2 moles instead of 0.15 moles. This material corresponds to the formulation $Ni^8Al_2(OH)_{20}CO_3.yH_2O$.

Example 12

The material described in example 11 was calcined by placing a weighed amount of the material in a calciner and raising the temperature at 20° C./min. until a temperature of 450° to 500° C. was reached. The material was kept at that temperature for about 15 h and then sieved to different mesh sizes. These sized materials were further calcined at 850° C.

Example 13

A 1 L, 3-neck round bottom flask equipped with a thermometer, reflux condenser, and mechanical stirrer was charged with 400 mL deionized water, 7.95 g (0.075 mol) of $Na_2CO_3$, and 18.0 g (0.45 mol) of NaOH pellets. A second solution containing 21.81 g (0.075 mol) of $Ni(NO_3)_2.6H_2O$, 17.44 g (0.075 mol) of $Cu(NO_3)_2.6H_2O$ and 28.14 g (0.075 mol) of $Al(NO_3)_3.9H_2O$, and 375 mL of water was prepared and added dropwise to the first solution while stirring for a period of about 1 h. After addition was complete, the gelatinous mixture (pH=8.6) was heated for about 15 h at 80°–85° C. The cooled mixture was then filtered, washed repeatedly with water, and dried overnight under vacuum at 70° C. The XRD of the material showed a typical hydrotalcite-like structure with d(001) value of 7.5Å. The material corresponds to the formulation $Cu_2Ni_2Al_2(OH)_{12}CO_3.4H_2O$.

Example 14

The material described in example 13 was calcined by placing a weighed amount of the material in a calciner and raising the temperature at 20° C./min. until a temperature of 450° to 500° C. was reached. The material was kept at that temperature for about 15 h and then sieved to different mesh sizes. These sized materials were further calcined at 850° C.

Example 15

A 1 L, 3-neck round bottom flask equipped with a thermometer, reflux condenser, and mechanical stirrer was charged with 400 mL deionized water and 19.8 g (0.495 mol) of NaOH pellets. A second solution containing 31.99 g (0.11 mol) of Ni(NO$_3$)$_2$.6H$_2$O, and 41.27 g (0.11 mol) of Al(NO$_3$)$_3$.9H$_2$O, and 340 mL of water was prepared and added dropwise to the first solution while stirring for a period of about 1 h. At this point the pH of the mixture was 9.3. After addition was complete, the gelatinous mixture was heated for about 15 h at 80°–85° C. The cooled mixture was then filtered, washed repeatedly with water, and dried overnight under vacuum at 70° C. The XRD of the material does not show typical hydrotalcite-like structure. This product was calcined at 700° C. to yield high NiO spinel, Ni$^2$Al$_2$O$_5$.

Example 16

A 1 L, 3-neck round bottom flask equipped with a thermometer, reflux condenser, and mechanical stirrer was charged with 400 mL deionized water and 22.4 g (0.56 mol) of NaOH pellets. A second solution containing 20.37 g (0.07 mol) of Ni(NO$_3$)$_2$,6H$_2$O, and 52.53 g (0.14 mol) of Al(NO$_3$)$_3$.9H$_2$O, and 340 mL of water was prepared and added dropwise to the first solution while stirring for a period of about 1 h. At this point the pH of the mixture was 10.3. A few drops of HNO$_3$ were added to reduce the pH to 9.5. After addition was complete, the gelatinous mixture was heated for about 15 h at 80°–85° C. The cooled mixture was filtered, washed repeatedly with water, and dried overnight under vacuum at 70° C. The XRD of the material did not show typical hydrotalcite-like structure. This product was calcined at 800° C. to yield the spinel, NiAl$_2$O$_4$.

Example 17

A Ni-based commercial catalyst was sieved to 40/60 mesh and used.

Example 18

A Ni-based commercial catalyst, different from Example 17, was sieved to 40/60 mesh and used.

Example 19

A 0.5 L, 3-neck round bottom flask equipped with a thermometer, reflux condenser, and mechanical stirrer was charged with 200 mL deionized water, 10.6 g (0.075 mol) of Na$_2$CO$_3$, and 28.0 g (mol) of NaOH pellets. A second solution containing 51.3 g of Mg(NO$_3$)$_2$.6H$_2$O, 37.5 g g of Al(NO$_3$)$_3$.9H$_2$O, and 160 mL of water was prepared and added dropwise to the first solution while stirring for a period of about 1 h. After addition was complete, the gelatinous mixture was heated for about 15 h at 80°–85° C. The cooled mixture was then filtered, washed repeatedly with water, and dried overnight under vacuum at 70° C. The XRD of the material shows typical hydrotalcite-like structure with d(001) value of 7.6Å.

Example 20

The material described in example 19 was calcined by placing a weighed amount of the material in a calciner and raising the temperature at 20° C./min. until a temperature of 450° to 500° C. was reached. The material was kept at that temperature for about 15 h and then sieved to different mesh sizes. These sized materials were further calcined at 850° C.

Example 21

The catalyst prepared or described in the above examples were evaluated for the formation of synthesis gas by the partial oxidation of methane. The evaluations were conducted using an apparatus consisting of a 12 inch by 16 mm diameter quartz reactor tube mounted vertically in a 3-zone furnace. Each zone was 2 inches. Positioned in the center of the reactor tube was a 4 mm diameter quartz tube. Typically 4 ml of catalyst was loaded in the quartz reactor tube and, using quartz wool plugs, the catalyst bed was positioned in the central heating zone of the furnace. Three thermocouples were located inside the 4 mm tube: one at the top, middle and bottom of the catalyst bed. The feed gas for the evaluation was a mixture of 7.5% oxygen (O$_2$) and 15% methane in nitrogen. The nitrogen maintained the mixture outside of the explosive envelope and it also served as an internal standard for the analysis of the product mixture by gas chromatography. The methane to synthesis gas evaluations were conducted at near atmospheric pressure and the hereinabove described testing apparatus was designed to shut off automatically when the pressure exceeded about 30" of water. The chromatographic analysis was done automatically at intervals of 20–30 hours. The tables that follow do not report all of the analytical data obtained, rather they show representative data taken early, in the middle, and at the end of the evaluation.

Hydrogen formation was analyzed by gas chromatography, and helium was used as the carrier gas (a thermal conductivity detector was used). Consequently, the values reported in the tables for hydrogen are +10%. Additionally, the selectivities reported for hydrogen are greater than 100% because two moles of hydrogen are theoretically possible for each mole of methane converted to synthesis gas by partial oxidation using molecular oxygen. Reaction temperature, flow rates, space velocity, residence time were as reported in the tables for each run.

Tables 1–8 show the results for the preparation of synthesis gas by the oxidation of methane using the catalysts of this invention. Specifically, Tables 1 and 2 show results using a catalyst derived from a hydrotalcite-like compound having formula: NiMg$_5$Al$_2$(OH)$_{16}$CO$_3$ and prepared according to Example 2. Table 3 shows the results using a catalyst derived from a hydrotalcite-like compound having formula: NiMg$_3$Al$_2$(OH)$_{12}$CO$_3$ and prepared according to Example 4. Table 4 shows the results using a catalyst derived from a hydrotalcite-like compound having formula: Ni$^2$Mg$_2$Al$_2$(OH)$_{12}$CO$_3$ and prepared according to Example 6. These data show that the catalysts containing nickel, magnesium and aluminum prepared from the hydrotalcite-like precursors all have excellent catalytic activity for the conversion of methane to synthesis gas by partial oxidation did not coke during the entire period tested.

Tables 5–7 show data for the preparation of synthesis gas using catalysts derived from Ni$^4$Al$_2$(OH)$_{12}$CO$_3$; Ni$^6$Al$_2$(OH)$_{16}$CO$_3$; and Ni$^8$Al$_2$(OH)$_{20}$CO$_3$ compounds prepared according to Examples 8, 10 and 12, respectively. These data show that the catalyst derived from the Ni$^4$Al$_2$(OH)$_{12}$CO$_3$ hydrotalcite-like precursor is an excellent catalyst for preparing syngas by the partial oxidation of methane. The other two catalysts, which were also active, did not maintain their activity as the other catalysts derived from hydrotalcite-like compounds. Table 8 shows data for a catalyst prepared in Example 14 from a Cu$_2$Ni$^2$Al$_2$(OH)$_{12}$CO$_3$ hydrotalcite-like compound. This catalyst is also an excellent catalyst for the preparation of synthesis gas from methane and oxygen.

Tables 9–12 shows data for the conversion of methane to synthesis gas using other nickel containing materials. Table 9 shows data for the catalyst described in Example 15, a spinel. While synthesis gas production was initially excellent, the spinel catalyst deactivated after 161 hours of use. Table 10 shows the data for a $NiO/Al_2O_3$ catalyst prepared according to Example 16. This catalyst exhibited excellent conversions of methane to synthesis gas compared to commercially available Ni on alumina catalyst. Table 11 shows the data for commercially available Ni on alumina catalyst (Example 17). While syngas production was initially excellent, deactivation occurred after only 55 hours on stream. Table 12 shows the data for another commercial nickel-containing catalyst that has been used for steam reforming of hydrocarbons. When used as a catalyst for the partial oxidation of methane, it initially demonstrated excellent conversion to synthesis gas, however, it deactivated rapidly after 26 hours of use.

Table 13 shows data for the preparation of synthesis gas using a catalyst derived from a hydrotalcite-like compound having formula $Mg_4Al_2(OH)_{12}CO_3$ and prepared according to Example 20. These data demonstrate that the catalyst prepared from a hydrotalcite-like composition containing magnesium and aluminum but no nickel is not as selective a catalyst for preparing synthesis gas by the partial oxidation of methane as the catalysts derived from hydrotalcite-like compounds that do not contain nickel.

TABLE 1

Partial Oxidation of Methane Using Catalyst Derived from $NiMg_5Al_2(OH)_{16}CO_3$

| HOURS ON STREAM | 6:25 | 55:17 | 202:06 | 276:25 |
|---|---|---|---|---|
| Conditions[a] Temp. °C. | 752.1 | 750.1 | 749.9 | 750.0 |
| Conversions: | | | | |
| $CH_4$, mol %[b] | 94.88 | 94.09 | 95.00 | 94.90 |
| $O_2$ | 99.74 | 99.76 | 99.73 | 99.73 |
| Selectivities, mol % | | | | |
| $H_2$ | 169.61 | 169.21 | 172.03 | 166.54 |
| CO | 97.40 | 97.55 | 96.95 | 96.65 |
| $CO_2$ | 2.60 | 2.45 | 3.05 | 3.35 |
| $H_2/CO$ | 1.74 | 1.74 | 1.77 | 1.72 |

[a]Catalyst volume = 4.0 ml. Feed gas flow rate = 101.6 ml./min., Space velocity = $1.52 \times 10^3$ hr$^{-1}$, Weight hourly space velocity = $2.39 \times 10^3$ ml.g./hr., Residence time = 0.252 sec.
[b]Conversion based on the difference between the amount of methane added to the reactor and the amount of methane recovered.

TABLE 2

Partial Oxidation of Methane Using Catalyst Derived from $NiMg_5Al_2(OH)_{16}CO_3$

| Hours on Stream | 6:24 | 177:22 | 275:07 | 348:3 |
|---|---|---|---|---|
| Conditions[a] Temp. °C. | 750 | 750 | 750 | 750 |
| Conversions: | | | | |
| $CH_4$, Mol %[b] | 94.99 | 93.49 | 93.56 | 94.9 |
| $O_2$ | 100.00 | 100.00 | 100.00 | 100.00 |
| Selectivities, mol % | | | | |
| $H_2$ | 164.27 | 169.60 | 164.59 | 167.62 |
| CO | 96.72 | 98.29 | 97.41 | 97.08 |
| $CO_2$ | 3.28 | 1.71 | 2.59 | 2.92 |
| $H_2/CO$ | 1.70 | 1.72 | 1.69 | 1.70 |

[a]Catalyst volume = 4.0 ml. Feed gas flow rate = 101.6 ml./min., Space velocity = $1.52 \times 10^3$ hr$^{-1}$, Weight hourly space velocity = $2.39 \times 10^3$ ml.g./hr., Residence time = 0.252 sec.
[b]Conversion based on the difference between the amount of methane added to the reactor and the amount of methane recovered.

TABLE 3

Partial Oxidation of Methane Using Catalyst Derived from $NiMg_3Al_2(OH)_{12}CO_3$

| HOURS ON STREAM | 15:24 | 137:31 | 235:14 | 333:04 |
|---|---|---|---|---|
| Conditions[a] Temp. °C. | 750 | 750 | 750 | 750 |
| Conversions: | | | | |
| $CH_4$, mol %[b] | 95.88 | 94.51 | 94.47 | 95.74 |
| $O_2$ | 99.73 | 100.00 | 100.00 | 100.00 |
| Selectivities, mol % | | | | |
| $H_2$ | 163.98 | 170.25 | 169.22 | 165.66 |
| CO | 97.27 | 97.91 | 97.79 | 97.44 |
| $CO_2$ | 2.73 | 2.09 | 2.21 | 2.50 |
| $H_2/CO$ | 1.69 | 1.74 | 1.73 | 1.61 |

[a]Catalyst volume = 3.5 ml. Feed gas flow rate = 102.1 ml./min., Space velocity = $1.75 \times 10^3$ hr$^{-1}$, Weight hourly space velocity = $6.96 \times 10^3$ ml.g./hr., Residence time = 0.220 sec.
[b]Conversion based on the difference between the amount of methane added to the reactor and the amount of methane recovered.

TABLE 4

Partial Oxidation of Methane Using Catalyst Derived from $Ni_2Mg_2Al_2(OH)_{12}CO_3$

| HOURS ON STREAM | 6:28 | 24.48 | 220.27 | 251:01 |
|---|---|---|---|---|
| Conditions[a] Temp. °C. | 800.0 | 800.0 | 800.0 | 800.1 |
| Conversions: | | | | |
| $CH_4$, mol %[b] | 97.56 | 97.46 | 97.54 | 97.53 |
| $O_2$ | 100.00 | 100.00 | 100.00 | 100.00 |
| Selectivities, mol % | | | | |
| $H_2$ | 162.44 | 160.15 | 164.30 | 162.00 |
| CO | 98.96 | 99.02 | 99.17 | 99.02 |
| $CO_2$ | 1.04 | 0.98 | 0.83 | 0.98 |
| $H_2/CO$ | 1.64 | 1.62 | 1.66 | 1.64 |

[a]Catalyst volume = 3.0 ml. Feed gas flow rate = 100.6 ml./min., Space velocity = $2.01 \times 10^3$ hr$^{-1}$, Weight hourly space velocity = $3.80 \times 10^3$ ml.g./hr., Residence time = 0.182 sec.
[b]Conversion based on the difference between the amount of methane added to the reactor and the amount of methane recovered.

TABLE 5

Partial Oxidation of Methane Using Catalyst Derived from $Ni_4Al_2(OH)_{12}CO_3$

| HOURS ON STREAM | 19:53 | 68:47 | 215:35 | 264:28 |
|---|---|---|---|---|
| Conditions[a] Temp. °C. | 751.0 | 748.9 | 752.3 | 747.5 |
| Conversions: | | | | |
| $CH_4$, mol %[b] | 94.64 | 94.37 | 95.59 | 95.57 |
| $O_2$ | 99.67 | 99.64 | 99.68 | 99.71 |
| Selectivities, mol % | | | | |
| $H_2$ | 172.17 | 168.44 | 165.90 | 162.33 |
| CO | 97.53 | 97.73 | 97.02 | 97.08 |
| $CO_2$ | 2.47 | 2.27 | 2.98 | 2.92 |
| $H_2/CO$ | 1.77 | 1.73 | 1.71 | 1.67 |

[a]Catalyst volume = 4.0 ml. Feed gas flow rate = 102 ± 0.4 ml./min. Space velocity = $1.53 \times 10^3$ hr$^{-1}$, Weight hourly space velocity = $3.06 \times 10^3$ ml.g./hr., Residence time = 0.252 sec.
[b]Conversion based on the difference between the amount of methane added to the reactor and the amount of methane recovered.

TABLE 6

Partial Oxidation of Methane Using Catalyst Derived from $Ni_6Al_2(OH)_{16}CO_3$

| HOURS ON STREAM | 10:54 | 59:44 | 84:10 | 108:37[c] |
|---|---|---|---|---|
| Conditions[a] Temp. °C. | 750 | 750 | 750 | 750 |
| Conversions: | | | | |
| $CH_4$, mol %[b] | 95.33 | 95.26 | 94.56 | — |
| $O_2$ | 100.00 | 100.00 | 100.00 | — |
| Selectivities, mol % | | | | |
| $H_2$ | 161.52 | 163.76 | 170.05 | — |
| CO | 96.89 | 97.19 | 97.86 | — |
| $CO_2$ | 3.11 | 2.81 | 2.14 | — |
| $H_2/CO$ | 1.67 | 1.68 | 1.74 | — |

[a]Catalyst volume = 3.5 ml. Feed gas flow rate = 101.1 ml./min., Space velocity = $1.73 \times 10^3$ hr$^{-1}$, Weight hourly space velocity = $2.33 \times 10^3$ ml.g./hr., Residence time = 0.22 sec.
[b]Conversion based on the difference between the amount of methane added to the reactor and the amount of methane recovered.
[c]The reactor shut down due to excessive pressure drop caused by coking of catalyst.

TABLE 7

Partial Oxidation of Methane Using Catalyst Derived from $Ni_xAl_y(OH)_{20}CO_3$

| HOURS ON STREAM | 1:54 | 99:37 | 148:26 | 172:50[c] |
|---|---|---|---|---|
| Conditions[a] Temp. °C. | 750.1 | 749.9 | 750 | 750 |
| Conversions | | | | |
| $CH_4$, mol %[b] | 95.70 | 94.26 | 94.46 | — |
| $O_2$ | 99.75 | 100.00 | 100.00 | — |
| Selectivities, mol % | | | | |
| $H_2$ | 163.57 | 169.38 | 172.23 | — |
| CO | 97.19 | 98.15 | 97.45 | — |
| $CO_2$ | 2.81 | 1.85 | 2.55 | — |
| $H_2/CO$ | 1.68 | 1.73 | 1.77 | — |

[a]Catalyst volume = 3.5 ml. Feed gas flow rate = 100.8 ml./min., Space velocity = $1.73 \times 10^3$ hr$^{-1}$, Weight hourly space velocity = $3.18 \times 10^3$ ml.g./hr., Residence time = 0.222 sec.
[b]Conversion based on the difference between the amount of methane added to the reactor and the amount of methane recovered.
[c]The reactor shut down due to excessive pressure drop caused by coking of catalyst.

TABLE 8

Partial Oxidation of Methane Using Catalyst Derived from $Cu_2Ni_2Al_2(OH)_{12}CO_3$

| HOURS ON STREAM | 10:54 | 59:40 | 132:47 | 157:10 |
|---|---|---|---|---|
| Conditions[a] Temp. °C. | 750 | 750 | 750 | 750 |
| Conversions | | | | |
| $CH_4$, mol %[b] | 95.12 | 95.42 | 95.61 | 95.56 |
| $O_2$ | 100.00 | 100.00 | 100.00 | 100.00 |
| Selectivities, mol % | | | | |
| $H_2$ | 172.42 | 172.45 | 169.72 | 165.16 |
| CO | 97.44 | 97.52 | 98.23 | 98.59 |
| $CO_2$ | 2.56 | 2.48 | 1.77 | 1.41 |
| $H_2/CO$ | 1.77 | 1.77 | 1.73 | 1.67 |

[a]Catalyst volume = 4.0 ml. Feed gas flow rate = 101.9 ml./min., Space velocity = $1.52 \times 10^3$ hr$^{-1}$, Weight hourly space velocity = $1.65 \times 10^3$ ml.g./hr., Residence time = 0.254 sec.

TABLE 8-continued

Partial Oxidation of Methane Using Catalyst Derived from $Cu_2Ni_2Al_2(OH)_{12}CO_3$

| HOURS ON STREAM | 10:54 | 59:40 | 132:47 | 157:10 |
|---|---|---|---|---|

[b]Conversion based on the difference between the amount of methane added to the reactor and the amount of methane recovered.

TABLE 9

Partial Oxidation of Methane Using $Ni_2Al_2O_5$ (Catalyst Derived from a NiAl Double Hydroxide)

| HOURS ON STREAM | 15:23 | 88:31 | 161:39 | 186.00[c] |
|---|---|---|---|---|
| Conditions[a] Temp. °C. | 750 | 750 | 750 | 750 |
| Conversions | | | | |
| $CH_4$, mol %[b] | 95.33 | 95.59 | 95.82 | — |
| $O_2$ | 100.00 | 100.00 | 100.00 | — |
| Selectivities, mol % | | | | |
| $H_2$ | 160.83 | 164.66 | 155.01 | — |
| CO | 97.20 | 97.35 | 97.08 | — |
| $CO_2$ | 2.80 | 2.65 | 2.92 | — |
| $H_2/CO$ | 1.65 | 1.69 | 1.60 | — |

[a]Catalyst volume = 4.0 ml. Feed gas flow rate = 101.6 ml./min., Space velocity = $1.52 \times 10^3$ hr$^{-1}$, Weight hourly space velocity = $1.65 \times 10^3$ ml.g./hr., Residence time = 0.252 sec.
[b]Conversion based on the difference between the amount of methane added to the reactor and the amount of methane recovered.
[c]The reactor shut down due to excessive pressure drop caused by coking of catalyst.

TABLE 10

Partial Oxidation of Methane Using $NiO/Al_2O_3$

| HOURS ON STREAM | 117:22 | 141:45 | 190:31 |
|---|---|---|---|
| Conditions[a] Temp. °C. | 752.7 | 751.3 | 751.0 |
| Conversions: | | | |
| $CH_4$, mol %[b] | 53.87 | 58.82 | 58.47 |
| $O_2$ | 100.00 | 100.00 | 100.00 |
| Selectivities, mol % | | | |
| $H_2$ | 105.27 | 126.23 | 124.23 |
| CO | 77.84 | 82.35 | 86.56 |
| $CO_2$ | 22.16 | 17.65 | 13.44 |
| $H_2/CO$ | 1.35 | 1.53 | 1.43 |

[a]Catalyst volume = 2.0 ml. Feed gas flow rate = 101.6 ml./min., Space velocity = $3.05 \times 10^3$ hr$^{-1}$, Weight hourly space velocity = $2.34 \times 10^3$ ml.g./hr., Residence time = 0.126 sec.
[b]Conversion based on the difference between the amount of methane added to the reactor and the amount of methane recovered.

TABLE 11

Partial Oxidation of Methane Using A Commercial Nickel-Containing Catalyst

| HOURS ON STREAM | 6:26 | 30:48 | 55:11 | 79:34[c] |
|---|---|---|---|---|
| Conditions[a] Temp. °C. | 748.9 | 749.3 | 749.3 | — |
| Conversions: | | | | |
| $CH_4$, mol %[b] | 95.67 | 95.51 | 95.56 | — |
| $O_2$ | 100.00 | 99.70 | 99.45 | — |
| Selectivities, mol % | | | | |

TABLE 11-continued

Partial Oxidation of Methane Using A Commercial Nickel-Containing Catalyst

| HOURS ON STREAM | 6:26 | 30:48 | 55:11 | 79:34[c] |
|---|---|---|---|---|
| $H_2$ | 172.26 | 170.79 | 174.03 | — |
| CO | 96.48 | 96.52 | 96.73 | — |
| $CO_2$ | 3.52 | 3.48 | 3.27 | — |
| $H_2/CO$ | 1.78 | 1.77 | 1.80 | — |

[a]Catalyst volume = 4.0 ml. Feed gas flow rate = 101.1 ml./min., Space velocity = 1.52 × 10³ hr⁻¹, Weight hourly space velocity = 1.77 × 10³ ml.g./hr., Residence time = 0.254 sec.
[b]Conversion based on the difference between the amount of methane added to the reactor and the amount of methane recovered.
[c]Reactor shut down due to excessive pressure drop caused by coking of catalyst.

TABLE 12

Partial Oxidation of Methane Using A Commercial Nickel-Containing Catalyst

| HOURS ON STREAM | 1:55 | 26:20 | 50:47[c] |
|---|---|---|---|
| Conditions[a] Temp. °C. | 750.0 | 750.0 | 26.3 |
| Conversions | | | |
| $CH_4$, mol %[b] | 94.95 | 94.97 | — |
| $O_2$ | 99.76 | 99.76 | — |
| Selectivities, mol % | | | |
| $H_2$ | 171.70 | 172.65 | — |
| CO | 97.39 | 97.38 | — |
| $CO_2$ | 2.61 | 2.62 | — |
| $H_2/CO$ | 1.76 | 1.77 | — |

[a]Catalyst volume = 4.0 ml. Feed gas flow rate = 100.6 ml./min., Space velocity = 1.51 × 10³ hr⁻¹, Weight hourly space velocity = 1.28 × 10³ ml.g./hr., Residence time = 0.255 sec.
[b]Conversion based on the difference between the amount of methane added to the reactor and the amount of methane recovered.
[c]Reactor shut down due to catalyst plugging.

TABLE 13

Partial Oxidation of Methane Catalyst Derived From $Mg_4Al_2(OH)_{12}CO_3$

| HOURS ON STREAM | 1:57 | 148:12 |
|---|---|---|
| Conditions[a] Temp. °C. | 750.1 | 749.9 |
| Conversions: | | |
| $CH_4$, mol %[b] | 33.25 | 33.08 |
| $O_2$ | 97.07 | 99.56 |
| Selectivities, mol % | | |
| $H_2$ | 57.50 | 32.85 |
| CO | 25.61 | 30.69 |
| $CO_2$ | 69.96 | 57.46 |
| $H_2/CO$ | | |

[a]Catalyzed volume = 4.0 ml. Feed gas flow rate = 100.6 ml./min., Space velocity = 1.51 × 10³ hr⁻¹, Weight hourly space velocity = 3.18 × 10³ ml.g./hr., Residence time = 0.255 sec.
[b]Conversion based on the difference between the amount of methane added to the reactor and the amount of methane recovered.

Example 22

A ruthenium-on-titania catalyst (0.1% by weight ruthenium) was evaluated for the formation of synthesis gas using the apparatus, feed materials, and analysis methods described in Example 21. The reaction temperature was 750° C., catalyst volume was 4.0 ml, feed gas flow rate was 102.1 ml./min., space velocity was 1.53×10³ hr−1, weight hourly space velocity was 1.83×10³ ml.g./hr., and the residence time was 0.251 sec. After 284.25 hours of operations, methane conversion was 53.11% and $O_2$ conversion was 99.78%.

The selectivities for the products were as follows:

| Selectivity, Mole % | |
|---|---|
| $H_2$ | 109.40 |
| CO | 59.09 |
| $CO_2$ | 40.91 |
| $H_2/CO$ | 1.85 |

Thus, while the ruthenium-based catalyst did not coke in the period tested, the catalysts of this invention demonstrated superior conversions of methane and selectivity to synthesis gas.

Example 23

A ruthenium-on-titania catalyst (0.5% by weight ruthenium) was evaluated for the formation of synthesis gas as in Example 22. The reaction temperature was 750.8° C., catalyst volume was 4.0 ml, feed gas flow rate was 101.6 ml/min., space velocity was 1.52×10³ hr⁻¹, weight hourly space velocity was 1.76×10³ ml.g./hr., residence time was 0.252 sec.

After 279:55 hours of operation, methane conversion was 71.53% and $O_2$ conversion was 99.75%. The selectivity for the products were as follows:

| Selectivity, Mole % | |
|---|---|
| $H_2$ | 140.93 |
| CO | 80.65 |
| $CO_2$ | 19.35 |
| $H_2/CO$ | 1.75 |

As in Example 22, this ruthenium based catalyst did not coke during the time period tested, however, the catalysts of this invention are superior for the formation of synthesis gas by the oxidation of methane.

Procedure for Examples 24–30

The catalyst of this invention, other nickel-containing catalysts, and a molybdenum-based catalyst were evaluated for the conversion of methane to synthesis gas using carbon dioxide as the source of oxygen atoms. These evaluations were conducted using a fixed-bed, single-pass reactor consisting of a 9 mm×11 mm×30 inch quartz tube with indentations located 4 inches from the bottom of the tube. The reactor was operated in a downflow mode and a three-zone furnace was used to maintain isothermal conditions. Steam and condensible hydrocarbon products were collected in a cold trap. Exit gas flow rates were measured by a wet test meter. Hydrogen sulfide, if present, was removed from the product stream using a wet scrubber. Analysis were performed by gas chromatography.

For the following evaluations using carbon dioxide, unless otherwise noted, the reaction temperature was 816° C., the volumetric space velocity was 7200 hr⁻¹ at STP, pressure was 300 psig, the ratio of carbon dioxide to methane in the feed gas was 1.25, and the ratio of water to methane was 1.0. If used, hydrogen sulfide was at 27 ppm (by volume) in the feed gas. Using these ratios of feed gas components, the feed gas for the carbon dioxide reforming reactions was as follows:

|  | Vol. % |
|---|---|
| $CO_2$ | 38.4 |
| $CH_4$ | 30.8 |
| $H_2O$ | 30.8 |
| $H_2S$ | 27 ppm |

Example 24

The hydrotalcite-derived catalyst prepared according to Example 8, sieved to 80–100 mesh, was evaluated for the carbon dioxide reforming of methane. A low concentration of hydrogen sulfide ($H_2S$) was in the feed. The results are reported in Table 14, and these data show that this catalyst is an effective catalyst for reforming using carbon dioxide. The methane and carbon dioxide conversions were 76% and 41%, respectively. Selectivity of the carbon to carbon monoxide was 99.5%.

Example 25

Table 14 shows the results for the reforming of methane using carbon dioxide in the presence of commercial nickel-containing reforming catalyst. The results are similar to that of Example 24, however, the conversion of carbon dioxide was lower.

Example 26

Table 14 shows the results for the reforming of methane using carbon dioxide in the presence of a molybdenum sulfide catalyst using the same conditions and feed materials used for Examples 24 and 25. Conversion of methane and carbon dioxide were significantly lower compared to Examples 24 and 25.

Example 27

The nickel catalyst of this invention prepared from Example 8 was tested under the same conditions used in Examples 24–26, however, the hydrogen sulfide was not included in the feed gases. The data from this run is also shown in Table 14. Conversion of methane and carbon dioxide were high at 77% and 40%, respectively. Carbon selectivity to carbon monoxide was 99.5%

The water to methane ratio was decreased to 0.5 to evaluate the effect of reduced water concentration in feed gas. The temperature of the reaction was then increased to 867° C. The data from these runs are shown in Table 15.

The reduced water resulted in an increase in carbon dioxide conversion from 40% to 52%, and a decrease in the ratio of hydrogen to carbon monoxide in the syngas product. The higher reaction temperature increased the methane and carbon dioxide conversion to 82% and 60%, respectively. Therefore, low water to methane ratios and higher reaction temperature maximize carbon dioxide conversion.

Example 28

The commercial nickel containing catalyst was also evaluated using lower ratios of water to methane and higher reaction temperatures. These data are also in Table 15.

Example 29

The reforming of methane using carbon dioxide was evaluated using a physical mixture of nickel oxide on alpha alumina. The catalyst composition contained 75 weight percent NiO. The same reaction conditions were used as in Examples 24–26 except no hydrogen sulfide was added to the feed gas mixture. The data, which are presented in Table 14, shows that the conversion of methane and carbon dioxide were only 30% and 11%, respectively.

Example 30

The nickel spinel prepared according to the method of Example 16 was evaluated as a reforming catalyst for the formation of synthesis gas by the reaction of carbon monoxide with methane. The reaction conditions used were the same as those used in Examples 24–26 except there was no hydrogen sulfide in the feed gas. The data in Table 14 shows that the spinel, after 100 hours of operation, is an effective catalyst for reforming methane using carbon dioxide. The methane and carbon dioxide conversion were 86% and 47%, respectively. Selectivity of the carbon to carbon monoxide was 99.5%.

TABLE 14

|  |  | ANALYSIS, VOL. % |  |  |  |  | CONV., % |  | SEL. |
|---|---|---|---|---|---|---|---|---|---|
| Ex. # | Hours | $H_2S^a$ | $H_2$ | CO | $CH_4$ | $CO_2$ | $H_2/CO$ | $CH_4$ | $CO_2$ | CO |
| 24 | 170 | Y | 43.1 | 31.8 | 6.4 | 18.5 | 1.36 | 76 | 41 | 99.5 |
| 25 | 120 | Y | 41.2 | 31.4 | 6.5 | 20.8 | 1.31 | 76 | 38 | 99.5 |
| 26 | 120 | Y | 30.1 | 22.8 | 18.4 | 28.4 | 1.32 | 47 | 26 | 99.0 |
| 27 | 150 | N | 42.4 | 32.0 | 6.2 | 19.2 | 1.30 | 77 | 40 | 99.5 |
| 28 | 150 | N | 42.6 | 32.9 | 6.0 | 18.4 | 1.30 | 77 | 42 | 99.5 |
| 29 | 4 | N | 24.8 | 13.6 | 24.2 | 37.1 | 1.80 | 30 | 11 | 99.0 |
| 30 | 100 | N | 44.4 | 35.2 | 3.6 | 15.9 | 1.30 | 86 | 47 | 99.5 |

[a] Y = $H_2S$ was present; N = $H_2S$ not present.

TABLE 15

|  | FEED GAS RATIOS[a] |  | CONVERSION, % |  |  |
|---|---|---|---|---|---|
| CATALYST | Temp. °C. | $H_2O/CH_4$ | $CH_4$ | $CO_2$ | $H_2/CO$ |
| Example 8 | 815 | 1.0 | 77 | 40 | 1.3 |
|  | 815 | 0.5 | 70 | 52 | 1.0 |
|  | 867 | 0.5 | 82 | 60 | 1.0 |
| Commercial Ni Cat. | 815 | 1.0 | 77 | 42 | 1.3 |
|  | 815 | 0.5 | 71 | 53 | 1.0 |
|  | 860 | 0.5 | 83 | 61 | 1.0 |
|  | 860 | 0.25 | 79 | 68 | 0.8 |

[a] Pressure was 300 psig, no hydrogen sulfide in feeds. Ratio of carbon dioxide to methane was 1.25.

Example 31

The catalyst of this invention prepared from the nickel-containing hydrotalcite-like composition [Ni$^4$Al$_2$(OH)$_{12}$]CO$_3$.4H$_2$O was compared to a commercial nickel-containing reforming catalyst for the reaction of methane with carbon dioxide. In this comparison, the gas hourly volumetric space velocity (GHSV) of the feed gas was varied and, as shown in Table 16, the catalyst of this invention was substantially more active in that conversions of methane at the high gas flow rates were considerably greater for the catalyst derived from the hydrotalcite-like catalyst precursor than for the commercial catalyst.

In this evaluation, the catalyst (0.02 cc) was diluted with 50 parts by weight of alpha alumina per part of catalyst. Additionally, the catalyst bed was preceded by a 1 inch bed of alumina and followed by a 0.25 inch bed of alumina. The ratio of carbon dioxide to methane in the feed was 1.2, the ratio of water to methane was 1.0, and the feed gas was 50% diluted with nitrogen. The reaction pressure was 100 psig, and the reaction temperature was as shown in Table 16.

TABLE 16

CONVERSION OF METHANE (%)

| GHSV | Catalyst from [Ni$_4$Al$_2$(OH)$_{12}$]CO$_3$ | | | Commercial Catalyst | | |
|---|---|---|---|---|---|---|
|  | 800° C. | 750° C. | 700° C. | 800° C. | 750° C. | 700° C. |
| 1.8 × 10$^5$ |  | 80.1 | 65.0 | 90.2 | 79.7 | 61.1 |
| 3.6 × 10$^5$ | 91.0 | 80.1 | 63.8 | 86.8 | 77.1 | 48.5 |
| 5.4 × 10$^5$ |  | 79.3 |  | 81.7 | 70.1 | 31.3 |
| 7.2 × 10$^5$ | 89.7 | 78.9 | 59.0 | 76.1 | 63.4 |  |
| 9.0 × 10$^5$ |  | 77.9 |  | 71.8 | 55.6 |  |
| 10.8 × 10$^5$ | 86.8 | 76.0 | 56.4 | 65.7 | 49.9 |  |
| 12.6 × 10$^5$ |  | 73.4 |  |  |  |  |

Example 32

Methane was stream-reformed to synthesis gas using the catalyst prepared according to Example 8 hereinabove. The same reactor was used as described hereinabove for Examples 24–30. The reactor was loaded with 0.33 grams (0.5 cc) of the catalyst (40–60 mesh size) and the catalyst bed was pretreated for 18 hours at 850° C. with a feed of water, hydrogen and nitrogen at a flow rate of 28,800 (volume gas/volume catalyst/hour at STP). The volumetric ratio of water, hydrogen gas and nitrogen gas was 109.1:10.9:120, respectively. After this pretreatment, the feed gas was changed to a 50/50 mole ratio of methane and water at a total gas flow rate of 120 sccm. After operating at these conditions, the composition of the gas exiting the reactor on a dry basis was as follows:

| COMPONENT | MOLE % |
|---|---|
| Methane | 6.6 |
| Carbon monoxide | 22.2 |
| Hydrogen gas | 69.1 |
| Carbon dioxide | 2.1 |
| H$_2$/CO mole ratio | 3.1 |

This example demonstrates that the catalyst of this invention is effective for the steam reforming of methane using low ratios of water (steam) to methane. Using this low ratio, a low molar ratio (i.e., 3:1) of hydrogen-to-carbon monoxide in the synthesis gas product was formed. During this evaluation, there was no evidence of coke formation.

The entire specification of U.S. patent Application Ser. No. 07/993,419, filed Dec. 21, 1992, is hereby specifically incorporated by reference.

Certain embodiments of the present invention have been set forth in the preceding description of the invention. However, alternate embodiments and various modifications will be apparent to those skilled in the art. These alternatives and modifications are considered to be equivalent and within the spirit and scope of the present invention.

Having described the invention, that which is claimed is:

1. A method for preparing synthesis gas comprising feeding water and a gaseous or vaporizable hydrocarbyl compound to a reaction zone containing a catalyst comprising the composition formed by heat treating under reforming conditions, a catalyst precursor composition comprising at least one hydrotalcite compound having formula:

$$[M^{2+}_{(1-x)}M^{3+}_x(OH)_2]^{x+}(A^{n-}_{x/n}) \cdot mH_2O,$$

wherein $M^{2+}$ is a metal ion having a valence of 2+ and is at least Ni$^{2+}$ ions; $M^{3+}$ is a metal ion having a valence of 3+; x is a number of about 0.10 to about 0.50; $A^{n-}$ is an anion having a negative charge of n; and m is 0 or a positive number, and wherein the catalyst contains metal particles of about 1 to about 1000 nanometers in size and containing at least nickel in the zero oxidation state; and reacting the hydrocarbyl compound and the water in the presence of the catalyst at a temperature and pressure sufficient to form a synthesis gas comprising carbon monoxide and molecular hydrogen.

2. The catalyst of claim 1 wherein the heat treating comprises heating the nickel-containing hydrotalcite compound to a temperature of at least 800° C.

3. The catalyst of claim 1 wherein the hydrocarbyl compound is a hydrocarbon having about 1 to about 20 carbon atoms.

4. The catalyst of claim 1 wherein the hydrocarbon comprises methane.

5. A catalyst for reforming a hydrocarbyl compound to prepare synthesis gas containing a mixture of carbon monoxide and molecular hydrogen, comprising a spinel composition formed by heat treating to a temperature of at least 700° C. under reforming conditions, a catalyst precursor comprising a composition formed by reacting sources of one or more metal ions in the +2 oxidation state and sources of one or more ions in the +3 oxidation state with an aqueous solution of a chemical base to form a gelatinous mixture, reacting the gelatinous mixture at temperatures of about 40° C. to about 90° C., cooling the mixture, washing with water and drying the resulting composition.

6. The catalyst of claim 5 wherein the spinel formed is a $M^{2+}M_2^{3+}O_4$ spinel where $M^{2+}$ is at least one member of a group consisting of Mg$^{2+}$, Zn$^{2+}$, Ni$^{2+}$, Fe$^{2+}$, Cu$^{2+}$, Co$^{2+}$, Mn$^{2+}$, Pd$^{2+}$ and Pt$^{2+}$ ions, and $M^{3+}$ is at least one member of a group consisting of Al$^{3+}$, B$^{3+}$, Cr$^{3+}$, Fe$^{3+}$, Ga$^{3+}$, In$^{3+}$, La$^{3+}$, Ni$^{3+}$, Co$^{3+}$, Mn$^{3+}$, Rh$^{3+}$, Ti$^{3+}$, and V$^{3+}$ ions.

7. The catalyst of claim 6 wherein $M^{2+}$ is at least Ni$^{2+}$ ions.

8. The catalyst of claim 6 wherein $M^{3+}$ is at least Al$^{3+}$ ions.

9. The catalyst of claim 5 wherein the catalyst precursor comprises at least one nickel-aluminum double hydroxide, and the spinel formed is Ni$^2$Al$_2$O$_5$, NiAl$_2$O$_4$ or a mixture thereof.

10. The catalyst of claim 5 wherein the catalyst precursor comprises a composition formed by reacting a source of at least nickel ions and a source of aluminum ions with an aqueous solution of a chemical base to a pH of less than about 10 to form a gelatinous mixture.

11. The catalyst of claim 10 wherein the spinel composition is a $M^{2+}Al_2O_4$ spinel where $M^{2+}$ are selected from a group consisting of $Mg_{2+}$, $Zn^{2+}$, $Ni^{2+}$, $Fe^{2+}$, $Cu^{2+}$, $Co^{2+}$, $Mn^{2+}$, $Pd^{2+}$ and $Pt^{2+}$ ions, and is at least $Ni^{2+}$.

12. The catalyst of claim 5 wherein the catalyst precursor comprises a composition formed by reacting a source of $Ni(NO_3)_2$ and a source of $Al(NO_3)_3$ with aqueous sodium hydroxide solution to a pH of about 9.5 to form a gelatinous mixture.

13. The catalyst of claim 12 wherein the heat treating is to a temperature of at least 800° C., and the spinel formed is $NiAl_2O_4$.

14. A method for preparing synthesis gas comprising feeding water and a gaseous or vaporizable hydrocarbyl compound to a reaction zone containing a catalyst comprising a spinel composition formed by heat treating to a temperature of at least 700° C. under reforming conditions, a catalyst precursor comprising a composition formed by reacting sources of one or more metal ions in the +2 oxidation state and sources of one or more metal ions in the +3 oxidation state with an aqueous solution of a chemical base to form a gelatinous mixture, reacting the gelatinous mixture at temperatures of about 40° C. to about 90° C., cooling the mixture, washing with water and drying the resulting composition; and reacting the hydrocarbyl compound and the water in the presence of the catalyst at a temperature and pressure sufficient to form a synthesis gas comprising carbon monoxide and molecular hydrogen.

15. The method of claim 14 wherein the spinel composition is a $M^{2+}Al_2O_4$ spinel where $M^{2+}$ are selected from a group consisting of $Mg^{2+}$, $Zn^{2+}$, $Ni^{2+}$, $Fe^{2+}$, $Cu^{2+}$, $Co^{2+}$, $Mn^{2+}$, $Pd^{2+}$ and $Pt^{2+}$ ions, and is at least $Ni^{2+}$.

16. The catalyst of claim 15 wherein the catalyst precursor comprises at least one nickel-aluminum double hydroxide, and the spinel formed is $Ni_2Al_2O_5$, $NiAl_2O_4$ or a mixture thereof.

17. The catalyst of claim 16 wherein the heat treating is to a temperature of at least 800° C., and the spinel formed is $NiAl_2O_4$.

18. The method of claim 14 wherein the catalyst precursor comprises a composition formed by reacting a source of $Ni(NO_3)_2$ and a source of $Al(NO_3)_3$ with aqueous sodium hydroxide solution to a pH of about 9.5 to form a gelatinous mixture.

19. The method of claim 14 wherein the hydrocarbyl compound is a hydrocarbon having about 1 to about 20 carbon atoms.

20. The method of claim 19 wherein the hydrocarbon comprises methane.

* * * * *

UNITED STATES PATENT AND TRADEMARK OFFICE
CERTIFICATE OF CORRECTION

PATENT NO.: 5,653,774

DATED: August 5, 1997

INVENTOR(S): Alakananda Bhattacharyya, Wen-Dong Chang, Mark S. Kleefisch, Carl A. Udovich Page 1 of 5

It is certified that error appears in the above-identified patent and that said Letters Patent is hereby corrected as shown below:

| Col. | Line | |
|---|---|---|
| 3 | 40 | reads "F. Cavani etal.," should read --F. Cavani et al.,-- |
| 5 | 41 | reads "$CO^{3+}$" should read --$Co^{3+}$-- |
| 5 | 42 | reads ""$TI^{3+}$" should read --$Tl^{3+}$-- |
| 5 | 58 | reads "$V_4O_{12}^{3-}$" should read --$V_4O_{12}^{4-}$-- |
| 5 | 61 | reads "$NHb_6O_{19}^{7-}$" should read --$HNb_6O_{19}^{7-}$-- |
| 5 | 61 | reads "$Ta_6^{3-}$" delete |
| 6 | 4 | reads "$(CO_3)_{0.125}0.5H_2$ is" should read -- $(CO_3)_{0.125} \cdot 0.5H_2O$ is-- |

UNITED STATES PATENT AND TRADEMARK OFFICE
CERTIFICATE OF CORRECTION

PATENT NO.: 5,653,774

DATED: August 5, 1997

INVENTOR(S): Alakananda Bhattacharyya, Wen-Dong Chang, Mark S. Kleefisch, Carl A. Udovich It is certified that error appears in the above-identified patent and that said Letters Patent is hereby corrected as shown below:

Patent reads:

| Col. | Line | |
|---|---|---|
| 6 | 38 | reads "$(OH)_{12}]CO_3 \cdot H_2O$" should read --$(OH)_{12}]CO_3 \cdot yH_2O$-- |
| 6 | 38 | reads "$[Ni_{14}A_{16}$" should read --$[Ni_{14}Al_6$-- |
| 6 | 51 | reads "Fe2+" should read --$Fe^{2+}$-- |
| 6 | 55 | reads "$V^{3+}, In^{3+};$" should read --$V^{3+}, Ti^{3+}, La^{3+}$, or $In^{3+}$;-- |
| 7 | 58 | reads "comprising a $M^{2+}$ component" should read --comprising a $M^{2+}O$ component-- |
| 8 | 7 | reads "$[M^{2+}{}_{(1-x)}M^{3+}{}_x(OH)_2]^{x+}(A_{a/x}{}^{n-})$" should read --$[M^{2+}{}_{(1-x)}M^{3+}{}_x(OH)_2]^{x+}(A_{x/n}{}^{n-})$-- |
| 8 | 23 | reads "Ni3+" should read --$Ni^{3+}$-- |

UNITED STATES PATENT AND TRADEMARK OFFICE
CERTIFICATE OF CORRECTION

PATENT NO.: 5,653,774
DATED: August 5, 1997
INVENTOR(S): Alakananda Bhattacharyya, Wen-Dong Chang, Mark S. Kleefisch, Carl A. Udovich It is certified that error appears in the above-identified patent and that said Letters Patent is hereby corrected as shown below:

Patent reads:

| Col. | Line | |
|---|---|---|
| 8 | 23 | reads "$CO^{3+}$" should read --$Co^{3+}$-- |
| 8 | 26 | reads "La3+" should read --$La^{3+}$-- |
| 9 | 25 | reads "added tea carbonate" should read --added to a carbonate-- |
| 9 | 57 | reads "Ser. No. 07/745,9$0_2$," should read --Ser. No. 07/745,902,-- |
| 10 | 36 | reads "$CH_4$ 1/2 $O_2$" should read --$CH_4$ + $1/2O_2$-- |
| 12 | 10 | reads "1 X $10^{-1}$." should read --1 X $10^5 hr^{-1}$.-- |
| 15 | 49 | reads "[$Ni^4$" should read --[$Ni_4$-- |

UNITED STATES PATENT AND TRADEMARK OFFICE
CERTIFICATE OF CORRECTION

PATENT NO.: 5,653,774

DATED: August 5, 1997

INVENTOR(S): Alakananda Bhattacharyya, Wen-Dong Chang, Mark S. Kleefisch, Carl A. Udovich It is certified that error appears in the above-identified patent and that said Letters Patent is hereby corrected as shown below:

Patent reads:

| Col. | Line | |
|---|---|---|
| 16 | 11 | reads "Ni$^6$Al$_2$" should read --Ni$_6$Al$_2$-- |
| 16 | 27 | reads "Ni$^8$Al$_2$" should read --Ni$_8$Al$_2$-- |
| 17 | 12 | reads "Ni$^2$Al$_2$O$_5$." should read --Ni$_2$Al$_2$O$_5$.-- |
| 18 | 27 | reads "+10%" should read --±10%-- |
| 18 | 43 | reads "Ni$^2$Mg$_2$" should read --Ni$_2$Mg$_2$-- |
| 18 | 51 | reads "Ni$^4$" should read --Ni$_4$-- |

UNITED STATES PATENT AND TRADEMARK OFFICE
CERTIFICATE OF CORRECTION

PATENT NO.: 5,653,774

DATED: August 5, 1997

INVENTOR(S): Alakananda Bhattacharyya, Wen-Dong Chang, Mark S. Kleefisch, Carl A. Udovich It is certified that error appears in the above-identified patent and that said Letters Patent is hereby corrected as shown below:

| Col. | Line | |
|------|------|---|
| 18 | 51 | reads "Ni$^6$" should read --Ni$_6$-- |
| 18 | 52 | reads "Ni$^8$" should read --Ni$_8$-- |
| 18 | 54 | reads "Ni$^4$" should read --Ni$_4$-- |
| 18 | 60 | reads "Ni$^2$" should read --Ni$_2$-- |
| 28 | 63 | (Claim 9) reads "Ni$^2$Al$_2$O$_5$" should read --Ni$_2$Al$_2$O$_5$-- |

Signed and Sealed this

Twenty-ninth Day of September, 1998

Attest:

BRUCE LEHMAN

*Attesting Officer*      *Commissioner of Patents and Trademarks*